United States Patent
He et al.

(10) Patent No.: US 12,360,268 B2
(45) Date of Patent: Jul. 15, 2025

(54) METHOD AND SYSTEM FOR DETERMINATION OF SEISMIC PROPAGATION VELOCITIES USING NONLINEAR TRANSFORMATIONS

(71) Applicant: SAUDI ARABIAN OIL COMPANY, Dhahran (SA)

(72) Inventors: Weiguang He, Beijing (CN); Yubing Li, Beijing (CN); Yue Ma, Beijing (CN); Yi Luo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 193 days.

(21) Appl. No.: 17/395,100

(22) Filed: Aug. 5, 2021

(65) Prior Publication Data

US 2023/0037886 A1     Feb. 9, 2023

(51) Int. Cl.
    *G01V 1/28*    (2006.01)
    *G01V 1/34*    (2006.01)

(52) U.S. Cl.
    CPC .............. *G01V 1/282* (2013.01); *G01V 1/345* (2013.01); *G01V 2210/624* (2013.01); *G01V 2210/66* (2013.01)

(58) Field of Classification Search
    CPC ...... G01V 1/00; G01V 2210/00; G01V 11/00; G01V 99/00; G01V 2200/00; G01V 3/00;
(Continued)

(56) References Cited

U.S. PATENT DOCUMENTS 10,635,926 B2 * 4/2020 Hara ..................... G06N 3/08
10,838,093 B2 * 11/2020 Akcelik ................. G01V 1/306
(Continued)

FOREIGN PATENT DOCUMENTS

CN    104237937 A    12/2014
CN    104570065 A    4/2015
(Continued)

OTHER PUBLICATIONS

He, W. et al., "Parametrization study of the land multiparameter VTI elastic waveform inversion"; Geophysical Journal International; vol. 213, Issue 3; pp. 1660-1672; Mar. 13, 2018 (13 pages).
(Continued)

*Primary Examiner* — Huy Q Phan
*Assistant Examiner* — Martin Walter Braunlich
(74) *Attorney, Agent, or Firm* — Osha Bergman Watanabe & Burton LLP

(57) ABSTRACT

Methods and systems are disclosed for forming an image of a subterranean region of interest. The method includes receiving an observed seismic dataset and a seismic velocity model for the subterranean region of interest, and generating a simulated seismic dataset based on the seismic velocity model and the geometry of the observed seismic dataset. The method further includes determining a transformed observed seismic dataset by applying a nonlinear amplitude transform to the observed seismic dataset and determining a transformed simulated seismic dataset by applying the same transform to the simulated seismic dataset. The method still further includes forming an objective function based on the transformed observed seismic dataset and the transformed simulated seismic dataset, and determining an updated seismic velocity model based upon finding an extremum of the objective function.

15 Claims, 15 Drawing Sheets

(58) Field of Classification Search
CPC .... G01V 5/00; E02B 1/00; E02D 1/00; E21B 2200/00; E21B 47/00; E21B 49/00; G06T 7/55

See application file for complete search history.

(56) References Cited

U.S. PATENT DOCUMENTS

| | | | |
|---|---|---|---|
| 10,996,372 B2* | 5/2021 | Denli | G06N 3/04 |
| 11,175,434 B2* | 11/2021 | Laverne | G01V 99/005 |
| 11,493,658 B2* | 11/2022 | Xia | G01V 1/50 |
| 11,906,697 B2* | 2/2024 | Shaalan | G01V 20/00 |
| 11,940,585 B2* | 3/2024 | Sun | G01V 1/50 |
| 2016/0139299 A1 | 5/2016 | Leger | |
| 2016/0334531 A1 | 11/2016 | Elkington et al. | |
| 2018/0156933 A1 | 6/2018 | Ahmed | |
| 2018/0196154 A1* | 7/2018 | Gomes | G01V 1/282 |
| 2019/0302293 A1 | 10/2019 | Zhang et al. | |
| 2020/0183031 A1 | 6/2020 | Denli et al. | |
| 2020/0183046 A1 | 6/2020 | Wheelock et al. | |
| 2020/0408943 A1* | 12/2020 | Qin | G01V 1/325 |
| 2021/0055436 A1 | 2/2021 | Wu et al. | |
| 2021/0372258 A1* | 12/2021 | Kazemi Nojadeh | G01V 1/46 |
| 2022/0390632 A1* | 12/2022 | Liu | G01V 1/303 |

FOREIGN PATENT DOCUMENTS

| | | | |
|---|---|---|---|
| CN | 107179545 A | 9/2017 | |
| CN | 108490486 A | 9/2018 | |
| CN | 111665549 A | 9/2020 | |
| WO | WO-2020046392 A1 * | 3/2020 | E21B 47/0025 |

OTHER PUBLICATIONS

Chi, Benxin et al., "Source-independent full-waveform inversion using an amplitude-semblance objective function"; SEG Technical Program Expanded Abstracts 2018; pp. 1268-1272; Aug. 27, 2018 (5 pages).

Gao, Fuchun et al., "A new objective function for full waveform inversion : differential semblance in the data domain"; SEG Technical Program Expanded Abstracts 2014; pp. 1178-1183; Aug. 5, 2014 (6 pages).

* cited by examiner

METHOD AND SYSTEM FOR DETERMINATION OF SEISMIC PROPAGATION VELOCITIES USING NONLINEAR TRANSFORMATIONS

BACKGROUND

Seismic surveys are frequently conducted by participants in the oil and gas industry. Seismic surveys are conducted over subterranean regions of interest during the search for, and characterization of, hydrocarbon reservoirs. In seismic surveys, a seismic source generates seismic waves which propagate through the subterranean region of interest are and detected by seismic receivers. Typically, both seismic sources and seismic receivers are located on the earth's surface. The seismic receivers detect and store a time-series of samples of earth motion caused by the seismic waves. The collection of time-series of samples recorded at many receiver locations generated by a seismic source at many source locations constitutes a seismic data set.

To determine earth structure, including the presence of hydrocarbons, the seismic data set may be processed. Processing a seismic data set includes a sequence of steps designed to correct for near-surface effects, attenuate noise, compensate of irregularities in the seismic survey geometry, calculate a seismic velocity model, image reflectors in the subterranean, calculate a plurality of seismic attributes to characterize the subterranean region of interest, and aid in decisions governing if, and where, to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for forming an image of a subterranean region of interest. The method includes receiving an observed seismic dataset and a seismic velocity model for the subterranean region of interest, and generating a simulated seismic dataset based on the seismic velocity model and the geometry of the observed seismic dataset. The method further includes determining a transformed observed seismic dataset by applying a nonlinear amplitude transform to the observed seismic dataset and determining a transformed simulated seismic dataset by applying the same transform to the simulated seismic dataset. The method still further includes forming an objective function based on the transformed observed seismic dataset and the transformed simulated seismic dataset and determining an updated seismic velocity model based upon finding an extremum of the objective function.

In general, in one aspect, embodiments relate to a non-transitory computer readable medium storing instructions executable by a computer processor, the instructions including functionality for receiving an observed seismic dataset and a seismic velocity model for the subterranean region of interest and generating a simulated seismic dataset based on the seismic velocity model and a geometry of the observed seismic dataset. The instructions further include functionality for determining a transformed observed seismic dataset formed by applying a nonlinear amplitude transform to the observed seismic dataset and determining a transformed simulated seismic dataset by applying the nonlinear amplitude transform to the simulated seismic dataset. The instructions further include functionality for forming an objective function based, at least in part, on the transformed observed seismic dataset and on the transformed simulated seismic dataset and determining an updated seismic velocity model based, at least in part, upon finding an extremum of the objective function.

In general, in one aspect, embodiments relate to system for forming an image of a subterranean region of interest. The system includes a seismic source to emit a radiated seismic wave, a plurality of seismic receivers for detecting and recording an observed seismic dataset generated by the radiated seismic wave, and a seismic processor. The seismic processor is configured to receive an observed seismic dataset and a seismic velocity model for the subterranean region of interest and to generate a simulated seismic dataset based, at least in part, on the seismic velocity model and a geometry of the observed seismic dataset. The seismic processor is further configured to determine a transformed observed seismic dataset, by applying a nonlinear amplitude transform to the observed seismic dataset and determine a transformed simulated seismic dataset by applying the nonlinear amplitude transform to the simulated seismic dataset and to form an objective function based, at least in part, on the transformed observed seismic dataset and on the transformed simulated seismic dataset. The seismic processor is still further configured to determine an updated seismic velocity model based, at least in part, upon finding an extremum of the objective function.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Disclosed herein are methods and systems for determining an updated seismic velocity model of a subterranean region of interest. The seismic velocity model may be an isotropic velocity mode or an anisotropic velocity model. The seismic velocity model may be found by matching a simulated seismic dataset to an observed seismic dataset by iteratively simulating a seismic dataset for a seismic velocity model and determining an updated seismic velocity based on the difference between the simulated and observed seismic datasets. Further, the methods and systems disclosed describe determining a seismic image of the subterranean region of interest based on the updated seismic velocity model and planning and drilling a wellbore based on the seismic image.

Figure 1:
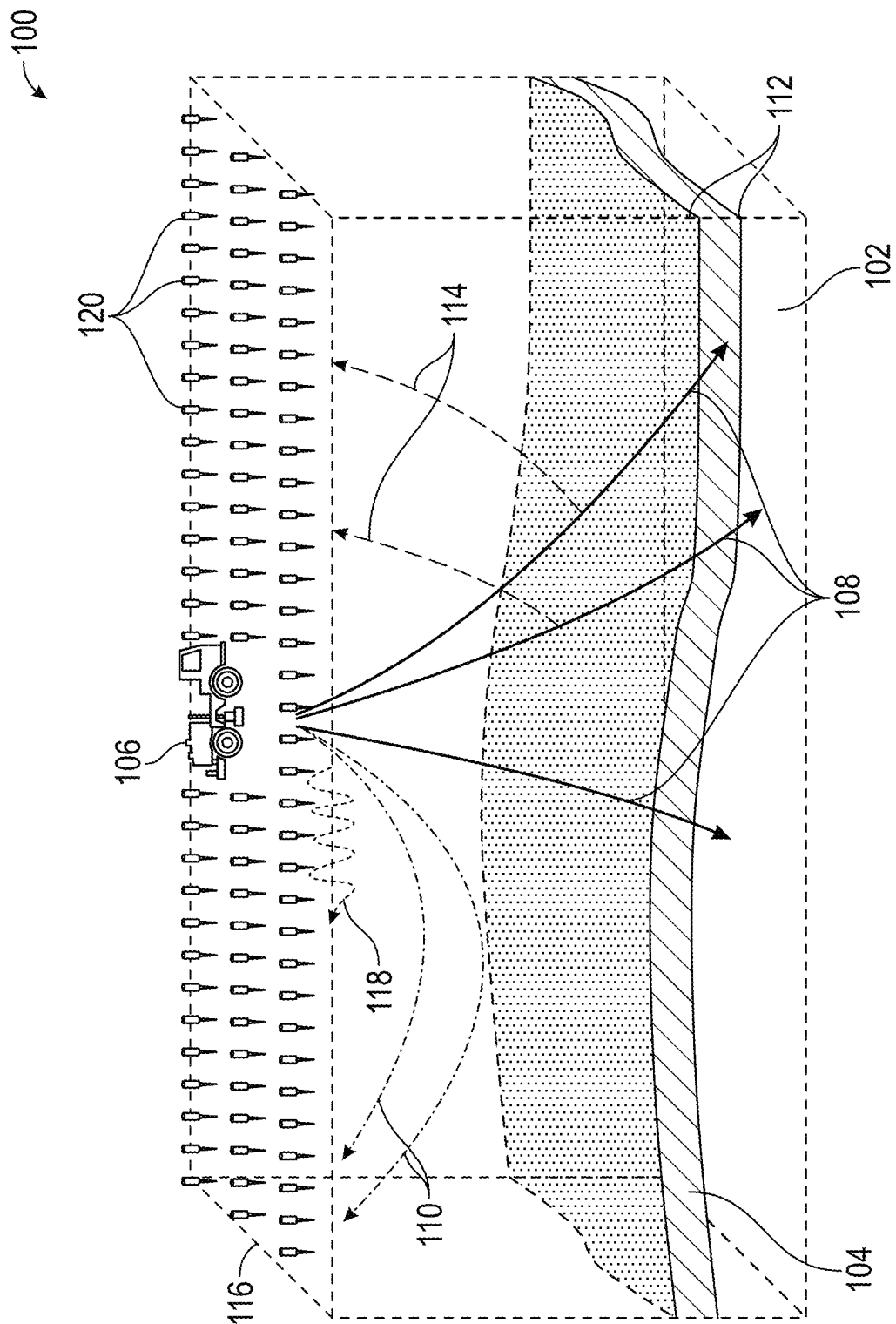
FIG. 1 depicts a seismic survey in accordance with one or more embodiments.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108). The type of seismic source (106) may depend on the environment in which it is used, for example on land the seismic source (106) may be a vibroseis truck or an explosive charge, but in water the seismic source (106) may be an airgun. The radiated seismic waves (108) may return to the Earth's surface (116) as refracted seismic waves (110) or may be reflected by geological discontinuities (112) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the Earth's surface (116) and hence are not influenced, nor contain information about, portions of the subterranean region of interest (102) where hydrocarbon reservoirs (104) are typically located. Seismic receivers (120) located on or near the Earth's surface (116) detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discreet sample times. Usually the origin of the time-series, denoted t=0, is determined by the activation time of the seismic source (106). This time-series may be denoted a seismic "trace". The seismic receivers (120) are positioned at a plurality of seismic receiver locations which we may denote $(x_r, y_r)$ where x and y represent orthogonal axes on the Earth's surface (116) above the subterranean region of interest (102). Thus, the plurality of seismic traces generated by activations of the seismic source (106) at a single location may be represented as a three-dimensional "3D" volume with axes $(x_r, y_r, t)$ where $(x_r, y_r)$ represents the location of the seismic receiver (116) and t denotes the time sample at which the amplitude of ground-motion was measured.

However, a seismic survey (100) may include recordings of seismic waves generated by a seismic source (106) sequentially activated at a plurality of seismic source locations denoted $(x_s, y_s)$. In some cases, this may be achieved using a single seismic source (106) that is moved to a new location between activations. In other cases, a plurality of seismic sources (106) positioned at different locations may be used. Irrespective of how they are acquired, all the seismic traces acquired by a seismic survey (100) may be represented as a five-dimensional volume, with coordinate axes $(x_s, y_s, x_r, y_r, t)$, and called a "seismic dataset".

When a seismic dataset is acquired by activating physical seismic sources and recording the actual resulting vibrations of the Earth using physical seismic receivers, the seismic dataset may be termed an "observed seismic dataset" and the component seismic traces "observed seismic traces". However, a seismic dataset may be simulated by solving the acoustic, elastic, or viscoelastic wave equations for at least one simulated seismic source and a plurality of seismic receiver locations. Typically, the solving is performed using a large capacity computer system. The resulting seismic dataset may be termed a "simulated seismic dataset" and the component seismic traces "simulated seismic traces".

Figure 2:
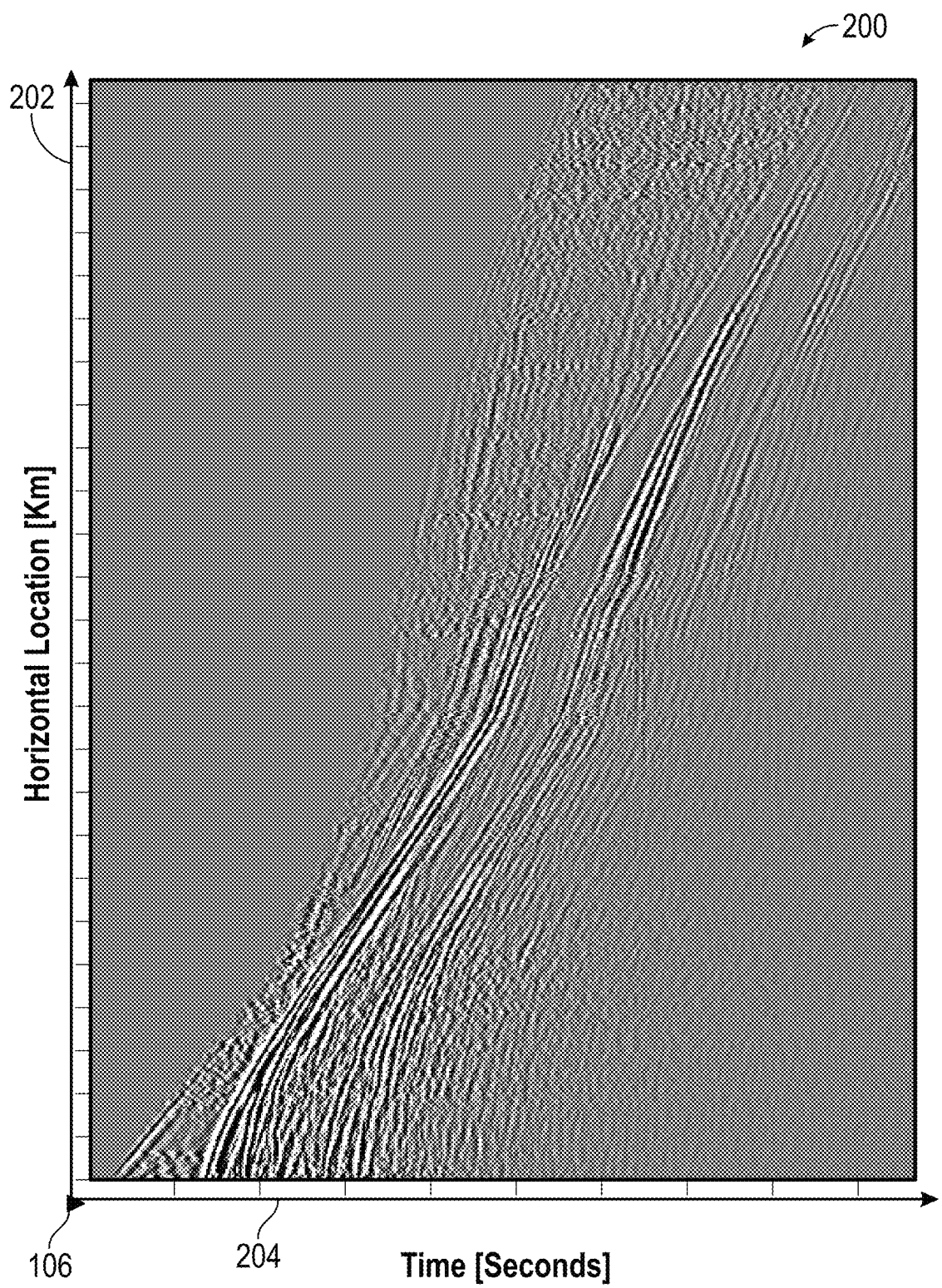
FIG. 2 shows a seismic dataset in accordance with one or more embodiments.

FIG. 2 shows a portion of a seismic dataset (200) in accordance with one or more embodiments. The portion of a seismic dataset (200) comprises a plurality of seismic traces for a single seismic source (106) activation position. Each seismic trace runs horizontally with the recording time of each sample indicated by the horizontal axis (204). A plurality of seismic traces is displayed. Each seismic trace is displayed at a position on the vertical axis (202) corresponding to the horizontal location of the seismic receiver (120) that recorded the seismic trace. The amplitude of each trace is displayed on a grayscale where in accordance with some embodiments white or a pale gray may represent a large positive amplitude and black or dark gray may represent a large negative amplitude. In accordance with other embodiments, white or a pale gray may represent a large negative amplitude and black or dark gray may represent a large positive amplitude.

Information about the subterranean region of interest, such as its seismic propagation velocity, its reflectivity, and its pore fluid content may influence the characteristics of a seismic trace, including the sample amplitudes. A seismic dataset (200) may be processed or inverted to determine information about the subterranean region including, without limitation, estimating a seismic velocity or an image of geological discontinuities (112) within the subterranean region of interest (102). The geological discontinuities (112) may be boundaries between geological layers, the boundaries between different pore fluids, faults, fractures or groups of fractures within the rock. The geological discontinuities (112) may delineate a hydrocarbon reservoir (104).

Processing or inverting a seismic data set comprises a sequence of steps designed, without limitation, to correct for near surface effects, attenuate noise, compensate of irregularities in the seismic survey geometry, calculate a seismic velocity model, image reflectors in the subterranean region, calculate a plurality of seismic attributes to characterize the subterranean region of interest (102), and aid in decisions governing where to drill for hydrocarbons.

Figure 3:
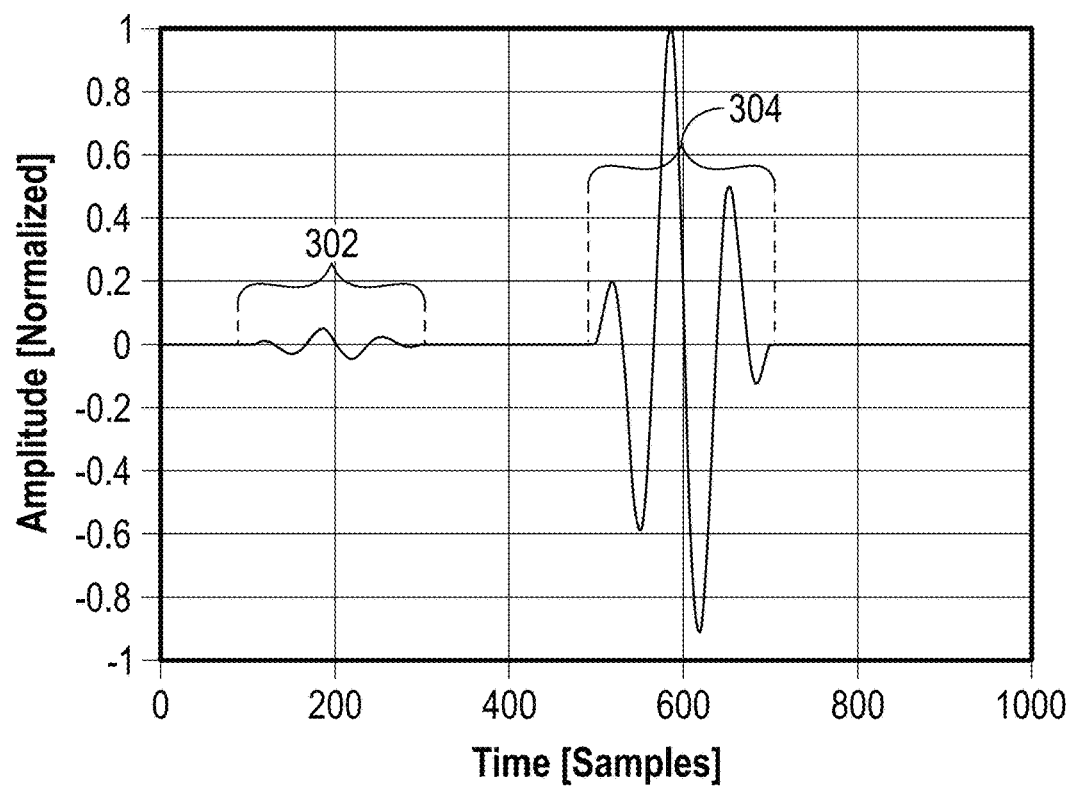
FIG. 3 shows a seismic trace in accordance with one or more embodiments.

The amplitude of a seismic trace can vary significantly over its duration, as depicted in FIG. 3 where a seismic "event" consisting of a plurality of adjacent samples at an early time (302) has a smaller amplitude than a seismic event at a later time (304). In some cases, the amplitude of a sample from an early time of the seismic trace can be much larger than the amplitude of a sample at a later time. In other cases, the amplitude at an intermediate or late time can be larger than at early times. Processing or inverting a seismic dataset (200) may involve combining a plurality of seismic events (302, 304) from different times within a seismic trace and events from different traces to infer information about the subterranean region of interest (102). Combining events with widely varying amplitudes may be problematic with lower amplitude events having less influence on the combination than higher amplitude events.

Figure 4:
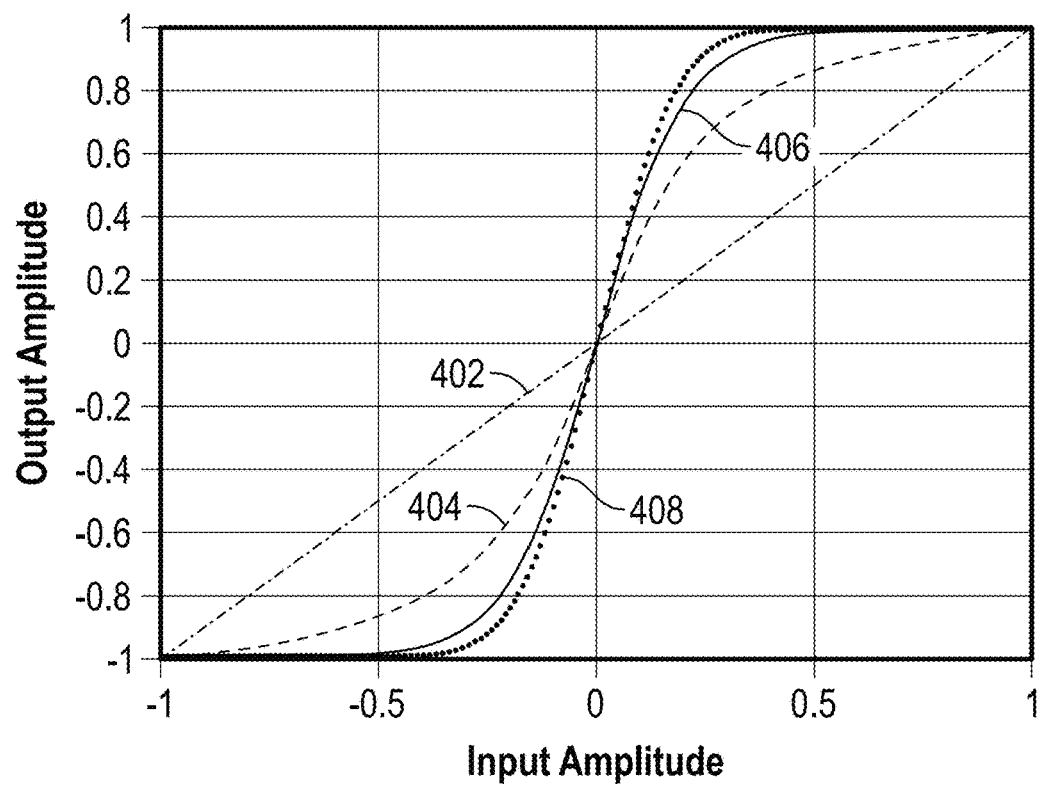
FIG. 4 shows nonlinear transforms in accordance with one or more embodiments.

FIG. 4 shows a plurality of transformations in accordance with one or more embodiments. These transformations may be used to transform an input value to an output value. The input value may be an amplitude of a sample of a seismic trace from an observed seismic dataset. The output value may be the amplitude of a sample of a transformed seismic trace from a transformed seismic dataset. One of the transformations is a linear transformation (402). A linear transformation may be represented by:

$$\bar{p} = \alpha p + \beta \qquad \text{Equation (1)}$$

where p is the input value, $\bar{p}$ is the output value, and $\alpha$ and $\beta$ are constant parameters. The linear transformation (402) depicted in FIG. 4 has $\alpha=1$ and $\beta=0$, thus $\bar{p}=p$. Increasing the input value for the linear transformation (402) from 0 to 0.5 increases the output value from 0 to 0.5 and increasing the input value from 0.5 to 1.0 increases the output value from 0.5 to 1.0.

In contrast, in accordance with one or more embodiments, nonlinear transformations (404, 406, 408) may magnify the output value of smaller input values by more than they magnify the output value of larger input values. There are many mathematical functions, familiar to one of ordinary skill in the art, that may form transformations with this property. For example, the hyperbolic tangent function $\bar{p}=\tanh(\alpha p)$ depicted in FIG. 4 by the line (404), the arc tangent function $\bar{p}=\tan^{-1}(\alpha p)$ depicted by the line (406), and the error function $\bar{p}=\text{erf}(\alpha p)$ all magnify the output value, $\bar{p}$, of smaller input values p by more than they magnify the output value of larger input values. Using the hyperbolic tangent (404) as an example, an input value of 0.5 produces an output value of approximately 0.85, giving a ratio of input value to output value of approximately 1.7. In contrast, an input value of 1.0 gives an output value of 1.0 and a ratio of input value to output value of 1.0.

In accordance with one or more embodiments, any nonlinear transformation function that magnifies an input sample with a smaller absolute value more than it magnifies an input sample with a greater absolute value may be called a convex nonlinear function. Any convex nonlinear function including, without limitation the hyperbolic tangent (404), the arc tangent (406), and the error function (408) may be applied to transform an observed seismic trace into a transformed seismic trace wherein the magnitude of smaller amplitude seismic events are magnified more than the amplitude of larger amplitude seismic events.

Figure 5A:
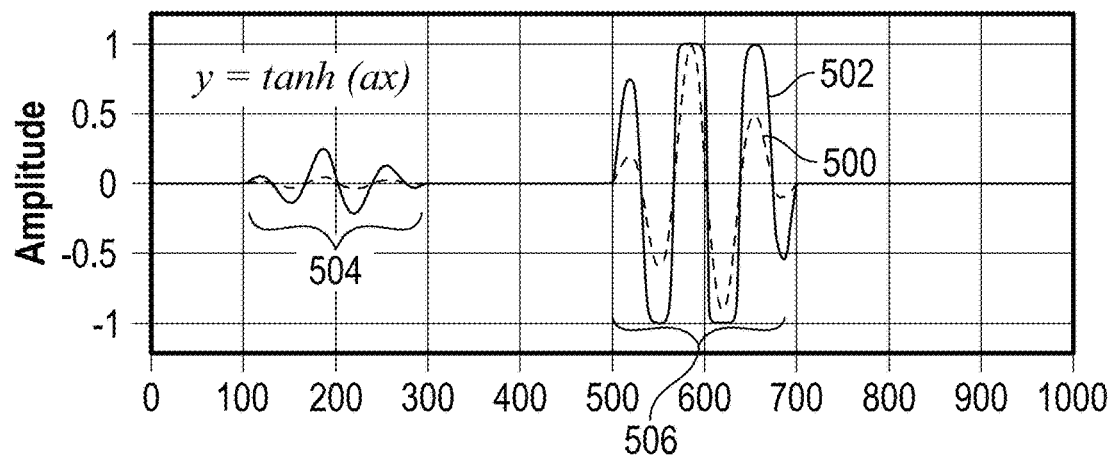
FIGS. 5A-5C show seismic traces in accordance with one or more embodiments.
Figure 5B:
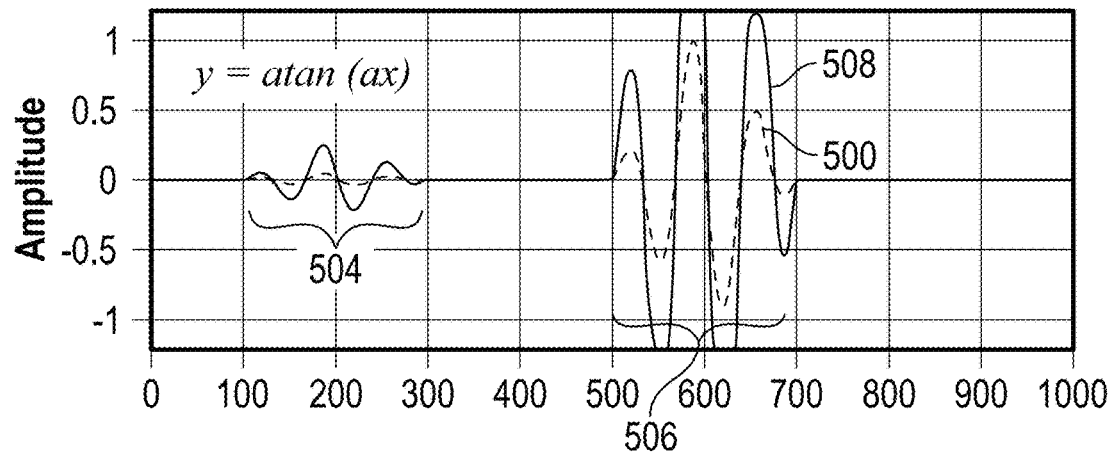
Figure 5C:
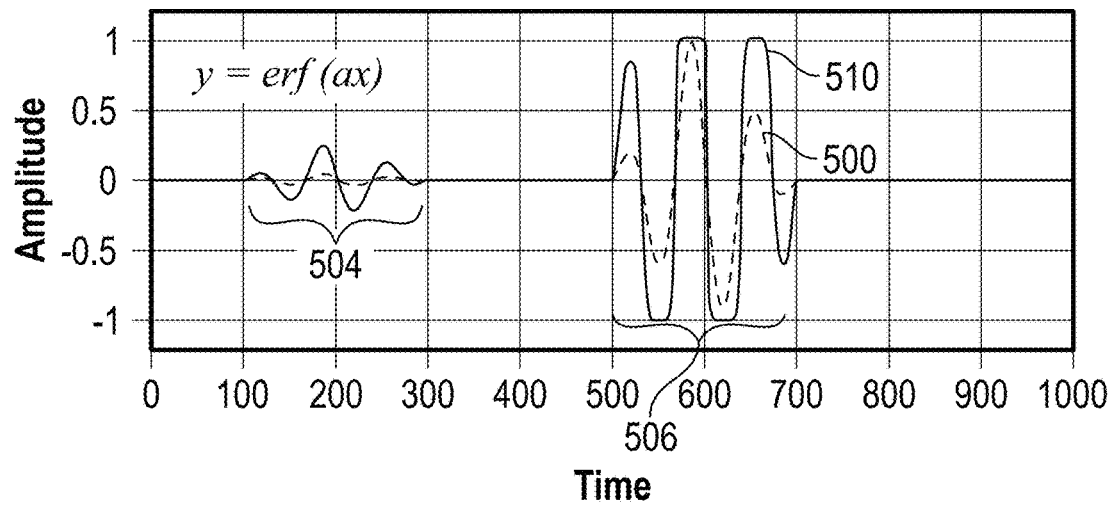

FIGS. 5A-5C show exemplary results of applying nonlinear transformations to a seismic trace (500), in accordance with one or more embodiments. FIG. 5A shows a result of applying a hyperbolic tangent nonlinear transformation (404) to the seismic trace (500) to produce a transformed seismic trace (502). The peak amplitude of the early seismic event (504) is magnified by approximately a factor of three, while the peak amplitude of the later seismic event (506) remains approximately unchanged. Similarly, FIG. 5B shows a result of applying an arc tangent nonlinear transformation (406) to the seismic trace (500) to produce a transformed seismic trace (508). In this case, the peak amplitude of the early seismic event (504) is magnified by approximately a factor of three, while the peak amplitude of the later seismic event (506) has been magnified by approximately a factor of 1.1. Finally, FIG. 5C shows a result of applying an error function nonlinear transformation (408) to the seismic trace (500) to produce a transformed seismic trace (510). The peak amplitude of the early seismic event (504) is magnified by approximately a factor of three, while the peak amplitude of the later seismic event (506) remains approximately unchanged.

In accordance with one or more embodiments, a seismic velocity model may be updated by calculating a seismic velocity increment and adding the seismic velocity increment to a pre-existing seismic velocity model to produce an updated seismic velocity model. Both the seismic velocity model and the seismic velocity increment may comprise a seismic velocity value at each of a plurality of locations within the subterranean region of interest (102). The seismic velocity values may change only with depth below the Earth's surface (116) or they may also vary along one or more horizontal spatial axes. The seismic velocity increment may be determined such that a simulated seismic dataset calculated for the resulting updated seismic velocity model matches the observed seismic dataset more closely than does the simulated seismic dataset calculated for the pre-existing seismic velocity model.

In accordance with some embodiments, the seismic velocity model may be an acoustic velocity model. An acoustic velocity model describes the propagation of only a single scalar wave type, usually a compressional wave. In other embodiments, the seismic velocity model may be an elastic velocity model. An elastic velocity model describes the propagation of both compressional waves and shear waves. Compressional waves and shear waves propagate with different velocities and an elastic velocity model describes both the compressional wave and the shear wave velocities. In accordance with some embodiments, the seismic velocity model may be an isotropic velocity model. In an isotropic velocity model, the propagation velocity may change with position, but at any given position waves propagating in every direction propagate with a uniform velocity. In accordance with other embodiments, the seismic velocity model may be an anisotropic velocity model. In an anisotropic velocity model, the propagation velocity may change with both position and with propagation direction.

Figure 6:
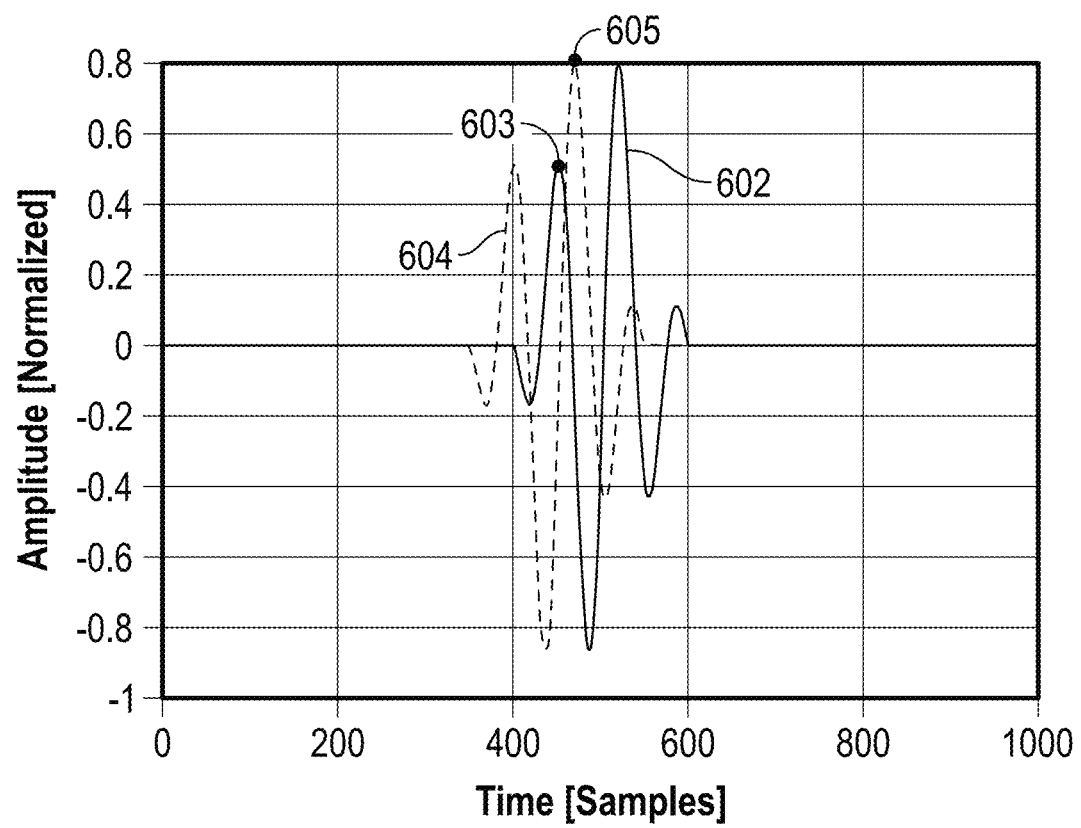
FIG. 6 shows seismic traces in accordance with one or more embodiments.

FIG. 6 depicts an observed seismic trace (602) selected from an observed seismic dataset and a simulated seismic trace (604), drawn from a simulated seismic dataset, in accordance with one or more embodiments. Both the observed seismic trace (602) and the simulated seismic trace (604) share the same seismic source location (106) and seismic receiver location (120), but in this depiction the observed seismic trace (602) and the simulated seismic trace (604) do not match one another well. The simulated seismic trace (604) is time-shifted when compared to the observed seismic trace (602). This time-shift may occur because the seismic velocity model used to simulate the simulated seismic trace (604) differs from the true seismic velocities within the subterranean region of interest (102). Since the simulated seismic trace (604) occurs earlier in time than the observed seismic trace (602) the seismic velocity model may contain seismic velocity values that are on average faster than true seismic velocities within the subterranean region of interest (102). Conversely, if the seismic velocity model used for simulation contained seismic velocity values that are on average slower than true seismic velocities the simulated seismic trace (604) may arrive later in time than the observed seismic trace (602).

In accordance with one or more embodiments, a seismic velocity increment may be determined by forming an objective function, J. An objective function may also be termed a "cost" function and one of ordinary skill in the art may use the terms objective function and cost function synonymously. The objective function combines a metric, $h(\bar{p}, \bar{d})$, of the difference between a transformed observed seismic trace, $\bar{d}$, and a transformed simulated seismic trace, $\bar{p}$, summed over a plurality of seismic source and seismic receiver locations:

$$J = \sum_{i=1}^{NS} \sum_{j=1}^{NR} h(\bar{p}_{ij}, \bar{d}_{ij}) \quad \text{Equation (2)}$$

where NS is the number of seismic source locations and NR is the number of seismic receivers in the observed seismic dataset. Furthermore, the seismic velocity increment may be determined by finding an extremum of the objective function by varying the seismic velocity model used to determine the simulated seismic dataset. The extremum of the objective function may be a minimum or a maximum of the objective function. One of ordinary skill in the art will readily appreciate that a new objective function may be formed, for example, by multiplying an exemplary objective function by a negative number, or subtracting an exemplary objective function from a large positive number to change an extremum from a maximum to a minimum or vice versa without departing from the scope of the invention.

In accordance with one or more embodiments, the metric $h(\bar{p}, \bar{d})$, may be based on a least-squares metric:

$$h(\bar{p}, \bar{d}) = \frac{1}{2} \int_0^T (\bar{p}(t) - \bar{d}(t))^2 dt = \frac{1}{2} <\bar{p} - \bar{d}|\bar{p} - \bar{d}> \quad \text{Equation (3)}$$

where T is the duration of the seismic trace. In accordance with other embodiments, the metric may be based on a cross-correlation function, a penalty-weighted cross-correlation, and an optimal transport function.

The extremum of the objective function J may be determined by forming a first-order perturbation, $\delta J$, for each transformed observed seismic trace:

$$\delta J = <\delta \bar{p} | Dh> \quad \text{Equation (4)}$$

where for the embodiments using the least-squares objective function, $Dh = \bar{p} - \bar{d}$.

Seismic waves excited by the adjoint sources may be simulated as backward-propagating in time using the seismic velocity model of the subterranean region of interest.

The seismic velocity increment may be determined from the backward-propagated seismic waves and the simulated forward-propagated in time seismic waves excited by the seismic sources (106). In accordance with one or more embodiments, the seismic velocity increment may be determined using the zero-lag cross-correlation between the simulated backward-propagated seismic waves and the simulated forward-propagated seismic waves. The seismic velocity increment may be multiplied by a scalar before it is added to the seismic velocity model to produce an updated seismic velocity model. The scalar may be determined so that seismic waves simulated in the updated seismic velocity model may generate an extremum of the objective function.

In accordance with one or more embodiments, when the nonlinear transform is the hyperbolic tangent transform and the metric function is the least-squares metric function, $\delta \bar{p}$ may be given by:

$$\delta \bar{p} = (1 - \bar{p}^2) \alpha \delta p \quad \text{Equation (5)}$$

and the adjoint source by:

$$s = (\bar{p} - \bar{d})(1 - \bar{p}^2) \alpha. \quad \text{Equation (6)}$$

Similarly, when the nonlinear transform is the arc tangent transform and the metric function is the least-squares metric function, $\delta \bar{p}$ may be given by:

$$\delta \bar{p} = \frac{1}{1 + (\alpha p)^2} \alpha \delta p \quad \text{Equation (7)}$$

and the adjoint source by:

$$s = \frac{\bar{p} - \bar{d}}{1 + (\alpha p)^2} \alpha. \quad \text{Equation (8)}$$

Furthermore, when the nonlinear transform is the error function transform and the metric function is the least-squares metric function, $\delta \bar{p}$ may be given by:

$$\delta \bar{p} = \exp\left(-\frac{(\alpha p)^2}{2}\right) \frac{2}{\sqrt{\pi}} \alpha \delta p \quad \text{Equation (9)}$$

and the adjoint source by:

$$s = (\bar{p} - \bar{d}) \exp\left(-\frac{(\alpha p)^2}{2}\right) \frac{2}{\sqrt{\pi}} \alpha. \quad \text{Equation (10)}$$

Figure 7:
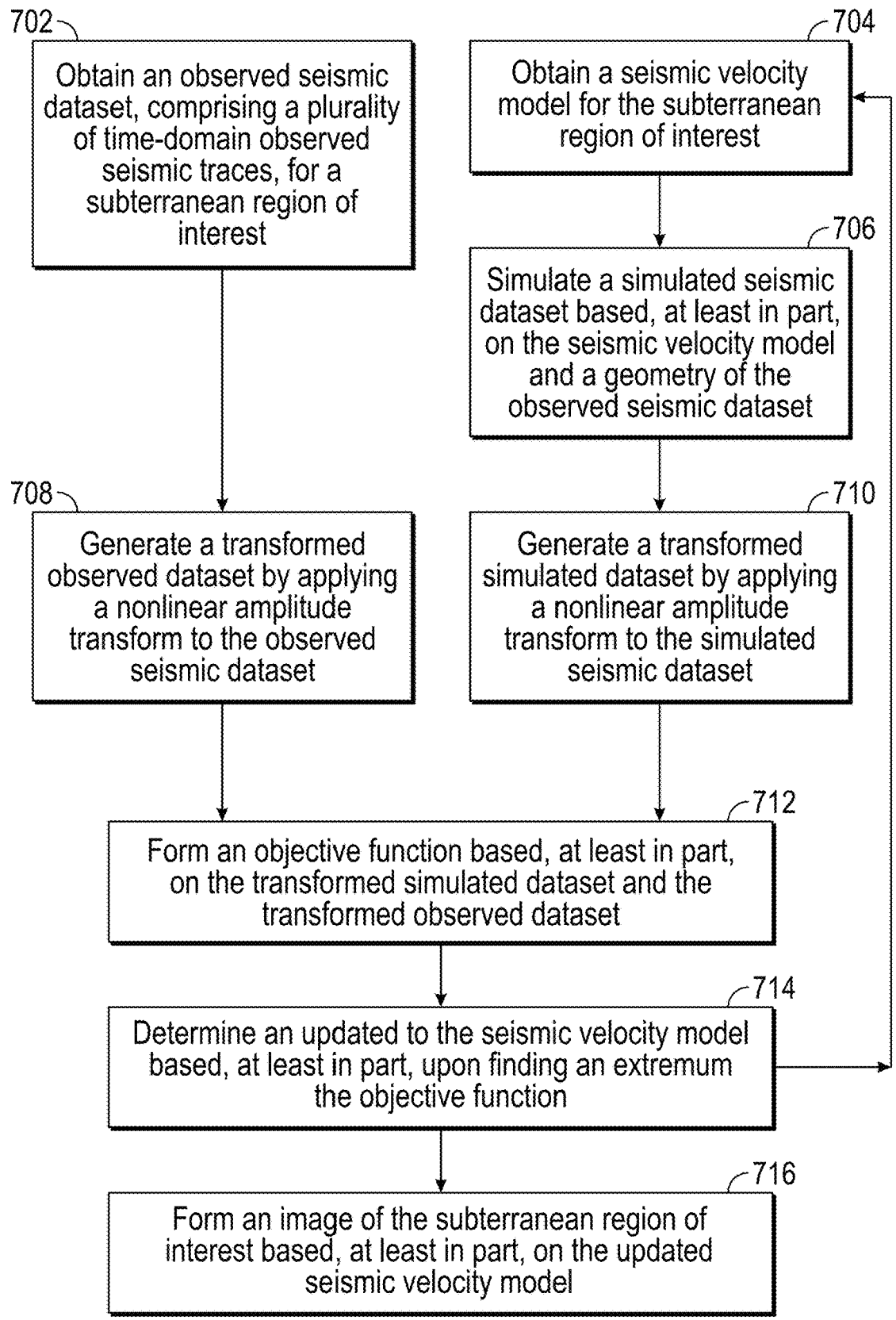
FIG. 7 show a flowchart in accordance with one or more embodiments.in accordance with one or more embodiments.

FIG. 7 shows a flowchart in accordance with one or more embodiments. In Step 702 an observed seismic dataset (200), comprising a plurality of time-domain observed seismic traces for a subterranean region of interest (102) is obtained. The observed seismic dataset (200) may contain a plurality of observed seismic traces recorded for each of a plurality of seismic source (106) excitations. Typically, there may be hundreds of thousands of observed seismic traces (206) for each seismic source (106) excitation and tens of thousands of seismic source excitations in an observed seismic dataset (200).

In Step 704 a seismic velocity model for the subterranean region of interest is obtained. The seismic velocity model may be obtained from acoustic well logs, well seismic datasets, or from surface seismic datasets previously acquired for the subterranean region of interest. The seismic velocity model may be determined from the observed seismic dataset obtained in Step 702 using approximate methods such as normal moveout analysis, Kirchhoff velocity analysis, or seismic velocity tomography. The seismic velocity model may be obtained from another observed seismic dataset for the subterranean region of interest.

In Step 706, a simulated seismic dataset may be simulated based, at least in part, on the seismic velocity model and a geometry of the observed seismic dataset. Simulating the seismic dataset may involve solving the elastic wave equation or an approximation to the elastic for a plurality seismic source (106) locations drawn from the observed seismic dataset and recording the simulated ground motion for a plurality of seismic receiver (120) locations drawn from the observed seismic dataset.

In Step 708, in accordance with one or more embodiments, a transformed observed seismic dataset may be generated by applying a nonlinear amplitude transform to the observed seismic dataset. The nonlinear amplitude transform may be any convex nonlinear transform. In particular, the nonlinear amplitude transform may be the hyperbolic tangent function, the arc tangent function, and the error function. In Step 710 a transformed simulated seismic dataset may be generated by applying a nonlinear amplitude transform to the simulated seismic dataset. In accordance to one or more embodiments, the nonlinear transform used in Step 710 should be the same nonlinear transform used in Step 708.

In Step 712, in accordance with one or more embodiments, an objective function is formed based, at least in part, on the transformed simulated seismic dataset, the transformed observed seismic dataset. In accordance with some embodiments, the objective function may be based on a least-squares metric such as the one shown in Equation (3). In accordance with other embodiments, the metric may be based on a cross-correlation function, a penalty-weighted cross-correlation, and an optimal transport function.

In Step 714, in accordance with one or more embodiments, an update to the seismic velocity model is determined based, at least in part, upon finding an extremum the objective function. The extremum of the objective function, J, may be determined by forming an adjoint-source, δJ, for each transformed observed seismic trace as shown in Equation (4). Explicit expressions for the adjoint sources required for the application of the least-squares objective function and the hyperbolic tangent nonlinear transform is given by Equation (6), for the least-squares objective function and the arc tangent nonlinear transform is given by Equation (8), and for the least-squares objective function and the error function nonlinear transform is given by Equation (10).

Seismic waves excited by the adjoint sources may be simulated as backward-propagating in time using the seismic velocity model of the subterranean region of interest. A seismic velocity increment may be determined from the backward-propagated seismic waves and the simulated forward-propagated in time seismic waves excited by the seismic sources (106). In accordance with one or more embodiments, the seismic velocity increment may be determined using the zero-lag cross-correlation between the simulated backward-propagated seismic waves and the simulated forward-propagated seismic waves. The seismic velocity increment may be multiplied by a scalar before it is added to the seismic velocity model to produce an updated seismic velocity model. The scalar may be determined so that seismic waves simulated in the updated seismic velocity model may generate an extremum of the objective function. The extremum may be either a maximum or a minimum without departing from the scope of the invention.

In Step 716, an image of the subterranean region of interest may be formed in accordance with one or more embodiments. The image may be formed by numerically simulating the forward-propagation of seismic waves generated by the seismic source (106) at a plurality of locations through an updated seismic velocity model and numerically simulating the backward-propagation of seismic waves generated by an adjoint source at each of the plurality of seismic receivers (120) through an updated seismic velocity model. Further, the image may be formed by combining the forward-propagated seismic waves and the backward-propagated seismic waves at a plurality of positions within the subterranean region of interest using an imaging condition. In accordance with one or more embodiments, the imaging condition may be a zero-lag cross-correlation coefficient.

FIGS. 8A-8H, FIGS. 9A-9C, FIGS. 10A-10D, FIGS. 11A-11C, FIGS. 12A-12D, and FIGS. 13A-13C show the intermediate results of an exemplary application of the workflow depicted in FIG. 7. Typically, the observed seismic dataset is acquired as described in FIG. 1 and the true seismic velocity model is never known precisely. To improve the pedagogical value of this example the observed seismic data itself is simulated numerically using a 2D numerical model of a subterranean region shown in FIGS. 8A-8D. This numerically simulated dataset, shown in FIG. 9A, will be referred to as the "observed seismic dataset" in this exemplary description, even though it is in fact simulated for a 2D seismic velocity model.

Figure 8A:
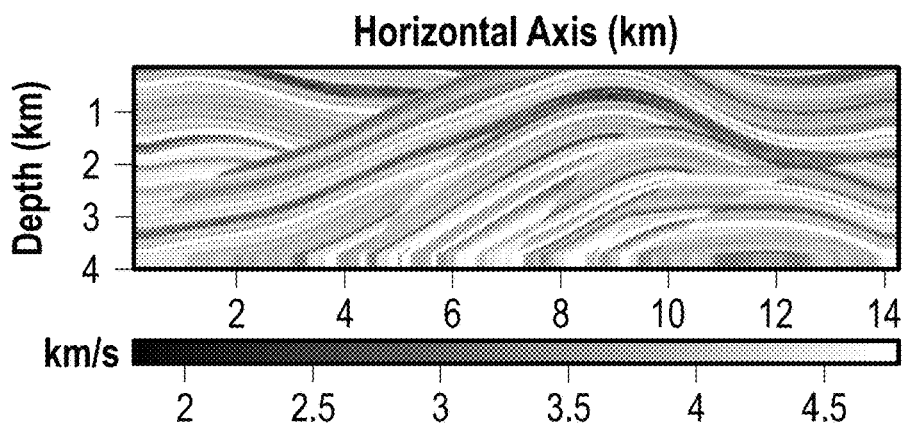
FIGS. 8A-8H show anisotropic seismic velocity models in accordance with one or more embodiments.
Figure 8B:
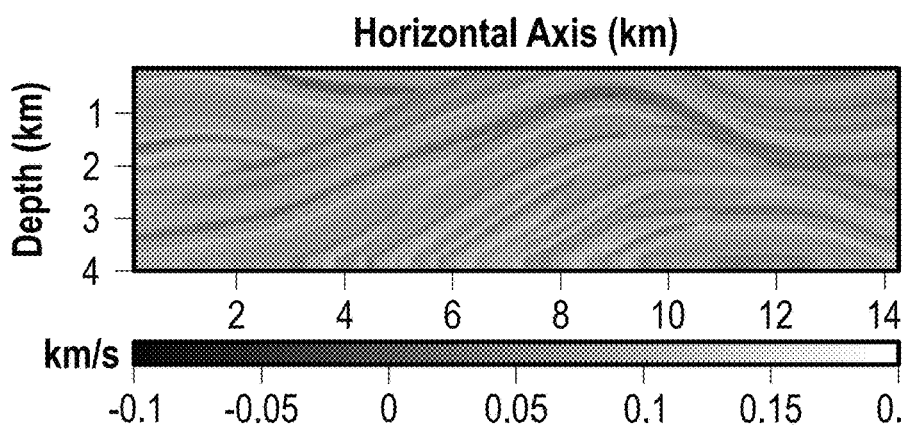
Figure 8C:
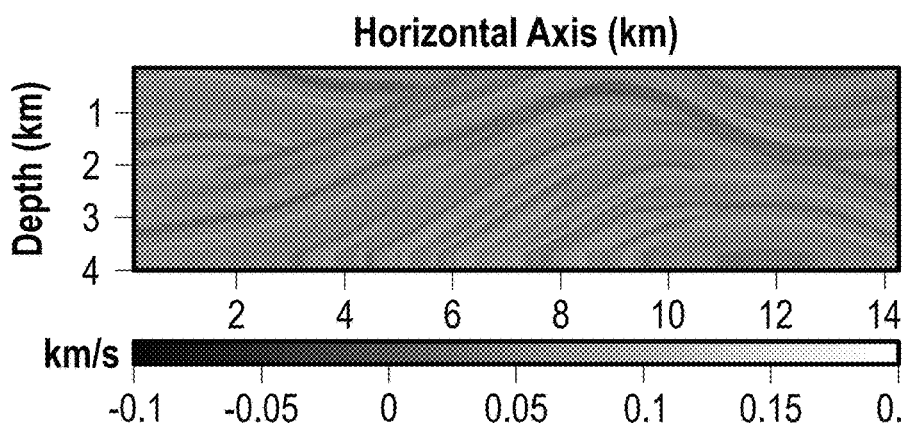
Figure 8D:
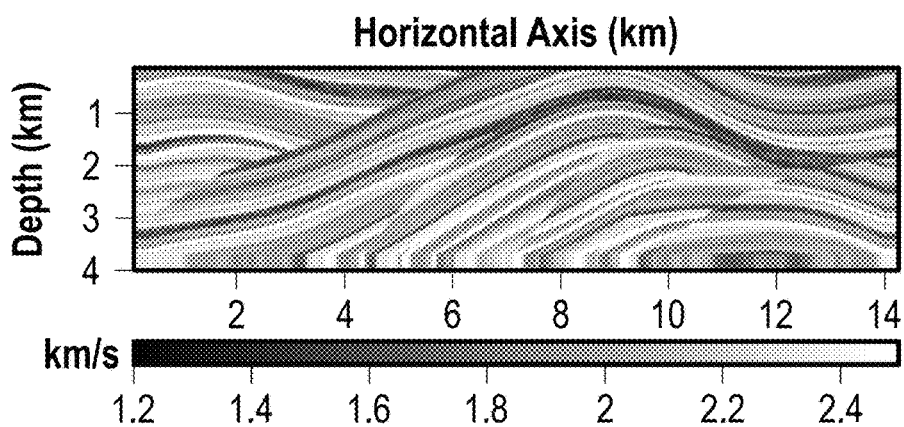

The 2D seismic velocity model, shown in FIG. 8A-8D, will be termed the "true seismic velocity model" throughout the description of this exemplary description. This true seismic velocity model is an anisotropic seismic velocity model. The true seismic velocity model shown in FIG. 8A represents a vertical plane through the subsurface covering the range 0-4 km. The horizontal axis represents horizontal position covering the range of 0-15 km. The grayscale represents the propagation velocity of a compressional seismic wave ranging between 1.5 and 4.7 km/s. This is a typical range of propagation velocity of a compressional seismic wave encountered in the subsurface. FIG. 8B shows the value of the anisotropic velocity parameter δ for the same cross-section depicted in FIG. 8A. The grayscale represents δ and ranges between −0.1 and +0.2. This is a typical range of δ encountered in the subsurface. FIG. 8C shows the value of the anisotropic velocity parameter η for the same cross-section depicted in FIG. 8A. The grayscale represents η and ranges between −0.1 and +0.2. This is a typical range of δ encountered in the subsurface. Finally, FIG. 8D represents the propagation velocity of a shear seismic wave ranging between 1.2 and 2.5 km/s. This is a typical range of propagation velocity of a shear seismic wave encountered in the subsurface.

Figure 8E:
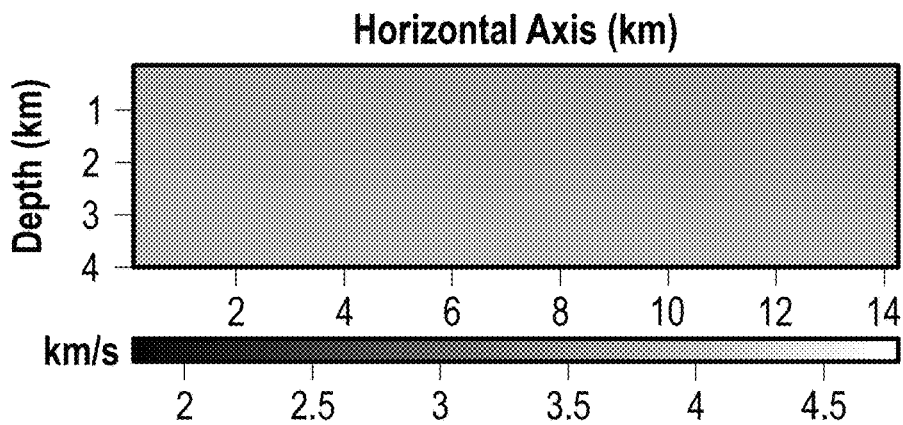
Figure 8F:
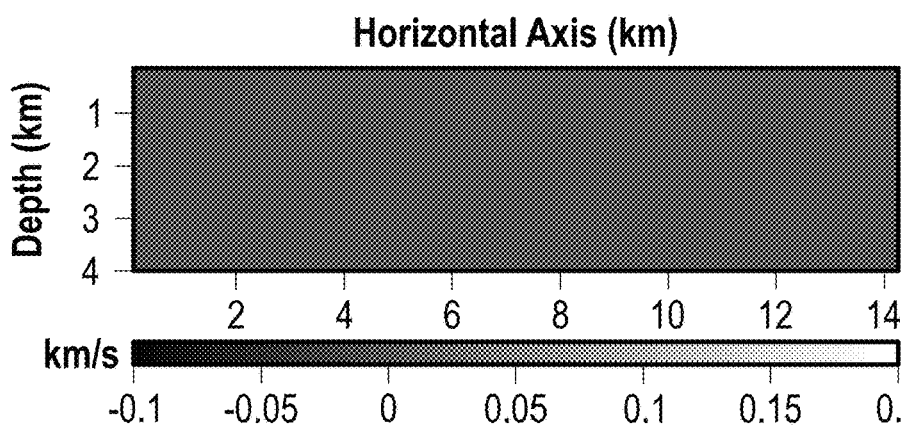
Figure 8G:
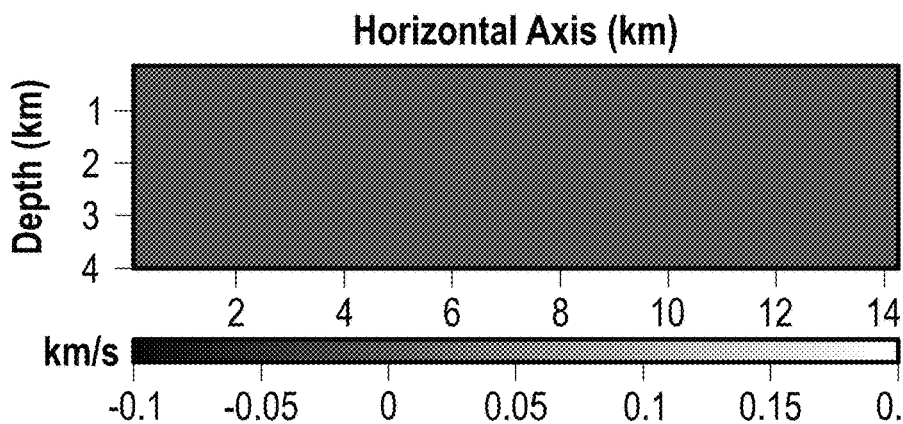
Figure 8H:
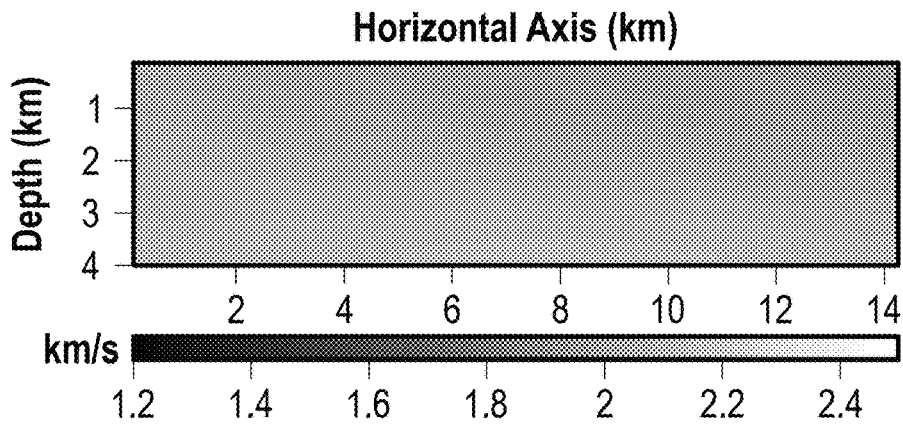

FIG. 8E-8H represent a seismic velocity model, in accordance with one or more embodiments. FIG. 8E represents a propagation velocity model for a compressional seismic wave and is intended to be an approximation to FIG. 8A. FIG. 8F represents a model for the anisotropic velocity parameter δ and is intended to be an approximation to FIG. 8B. FIG. 8G represents a model for the anisotropic velocity parameter η and is intended to be an approximation to FIG. 8C. Finally, FIG. 8H represents a propagation velocity model for a shear seismic wave and is intended to be an approximation to FIG. 8D. Both FIGS. 8F and 8G have uniform zero values throughout the model.

Figure 9A:
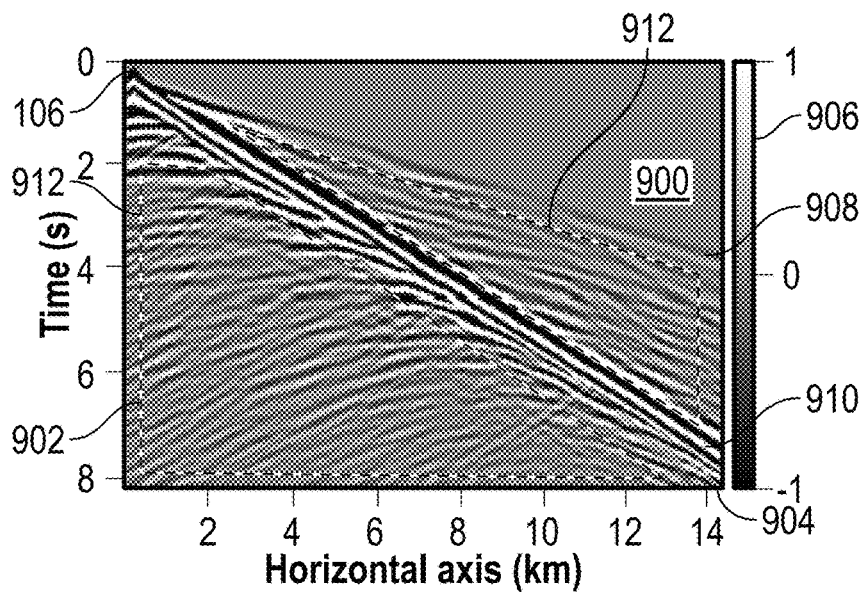
FIGS. 9A-9C show anisotropic seismic datasets in accordance with one or more embodiments.

FIG. 9A shows a portion of the observed seismic dataset simulated for the true seismic velocity model shown in FIGS. 8A-8D. This portion of the observed seismic dataset (900) comprises a plurality of seismic traces for a single seismic source (106) activation position. Each seismic trace runs vertically with the recording time of each sample indicated by the vertical axis (902). A plurality of seismic traces is displayed. Each seismic trace is displayed at a position on the horizontal axis (904) corresponding to the horizontal location of the seismic receiver (120) that recorded the seismic trace. The amplitude of each trace is displayed on a grayscale (906) where in accordance with some embodiments white or a pale gray may represent a large positive amplitude and black or dark gray may represent a large negative amplitude. In accordance with other embodiments, white or a pale gray may represent a large negative amplitude and black or dark gray may represent a large positive amplitude. One of ordinary skill in the art will readily understand that FIG. 9A represents the observation of many different waves at many different times, locations, and configurations.

Figure 9B:
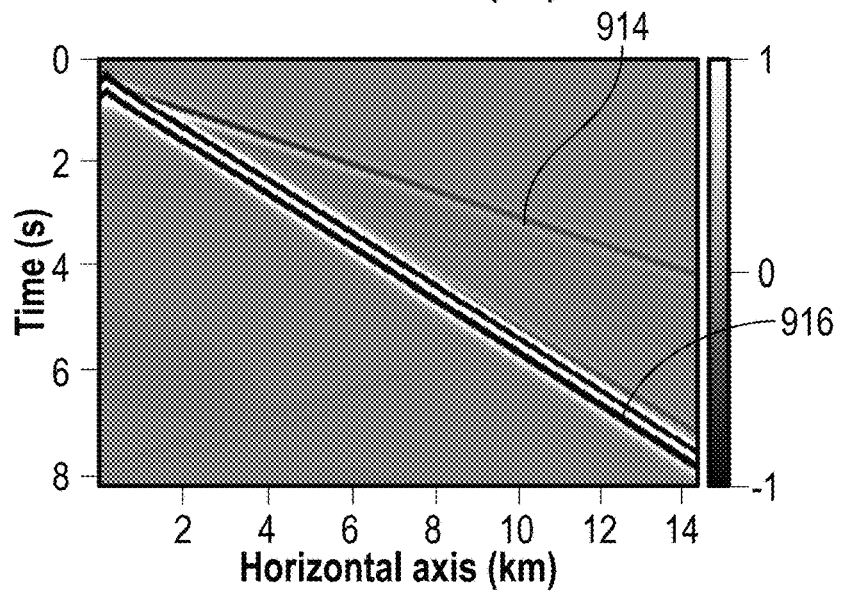
Figure 9C:
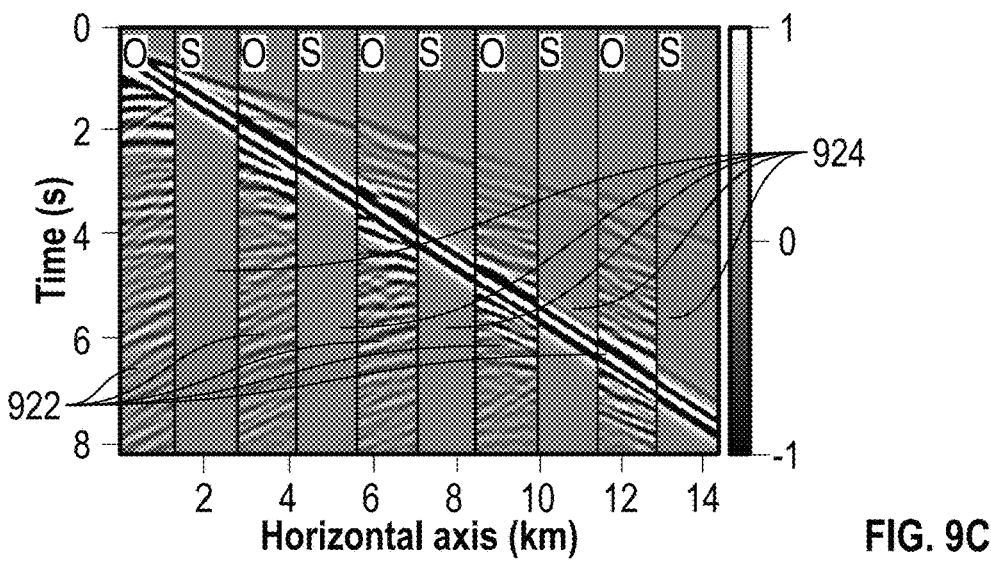

FIG. 9B shows a portion of the observed seismic dataset simulated for the seismic velocity model shown in FIGS. 8E-8H. The difference between FIG. 9B and FIG. 9A is readily apparent to one of ordinary skill in the art. In particular, FIG. 9B shows only two seismic events, a compressional seismic event (914) and a shear seismic event (916), both propagating across the array of seismic receivers at approximately constant velocities. Further, the complex coda (912) following the compressional seismic event (908) and the shear seismic event (910) in FIG. 9A is entirely absent in FIG. 9B. The difference between FIG. 9A and FIG. 9B is further depicted in FIG. 9C where horizontal portions of FIG. 9A (922) and horizontal portions of FIG. 9B (924) have been interleaved.

FIGS. 10A-10D shows exemplary results of applying the workflow depicted in FIG. 7 to an observed seismic dataset but without Steps 708 and 710. In such a modification of the workflow shown in FIG. 7 the output of Step 702 and the output of Step 706 are the inputs to Step 712 without applying the intervening Steps 708 or 710. Such a modified workflow may be considered to be a good approximation to a "conventional" workflow and the results of this modified workflow are presented herein for the purpose of comparison with the results of the claimed invention presented in FIGS. 12A-12D below.

Figure 10A:
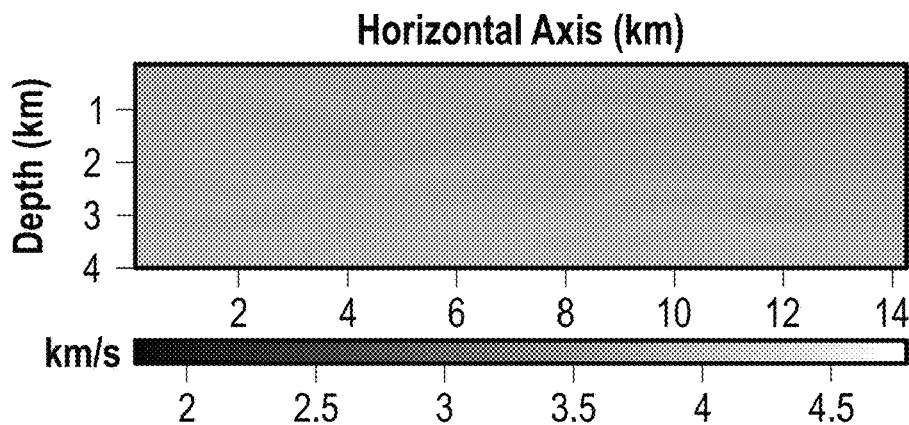
FIGS. 10A-10D show anisotropic seismic velocity models in accordance with one or more embodiments.

The compressional velocity component of the updated seismic velocity model shown in FIG. 10A may be compared to the compressional velocity component of the true seismic velocity model shown in FIG. 8A. The anisotropic velocity parameter δ component of the updated seismic velocity model shown in FIG. 10B may be compared to the anisotropic velocity parameter δ component of the true seismic velocity model shown in FIG. 8B. The anisotropic velocity parameter η component of the updated seismic velocity model shown in FIG. 10C may be compared to the anisotropic velocity parameter η component of the true seismic velocity model shown in FIG. 8C. Finally, shear velocity component of the updated seismic velocity model shown in FIG. 10D may be compared to the shear velocity component of the true seismic velocity model shown in FIG. 8D. In each case, depicted in FIGS. 10A-10D the updated seismic velocity model may be regarded as a smoothed and low resolution version of the true seismic velocity model depicted in FIGS. 8A-8D. Furthermore, it will be readily apparent to one of ordinary skill in the art that the smoothing and lose of resolution exhibited in FIGS. 10A-10D becomes great with increasing depth.

Figure 10B:
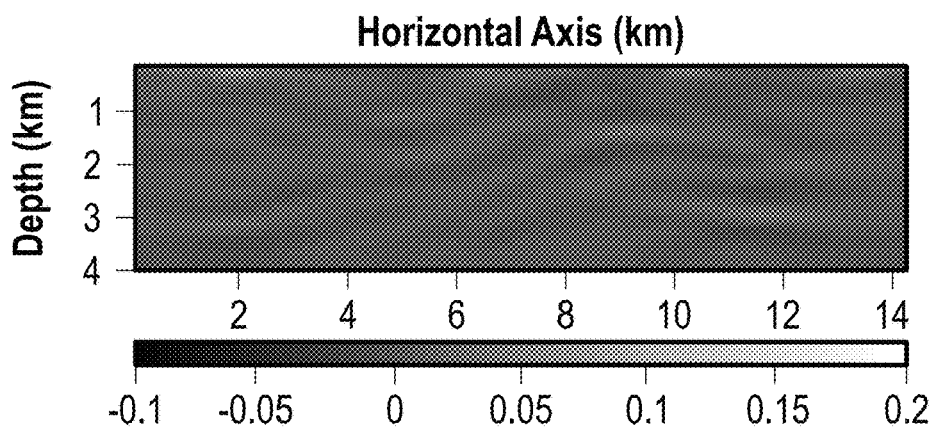
Figure 10C:
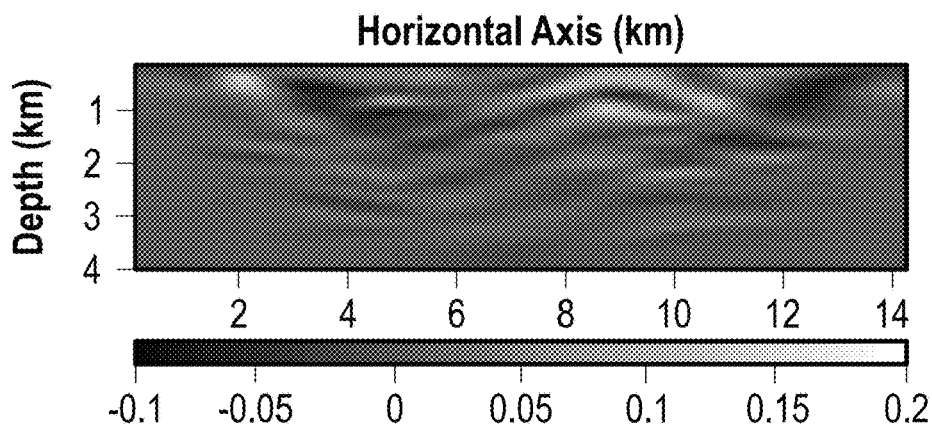
Figure 10D:
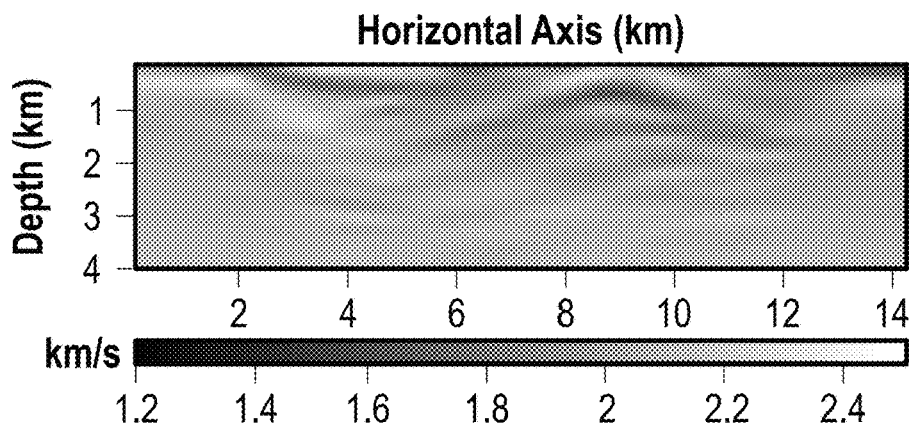
Figure 11A:
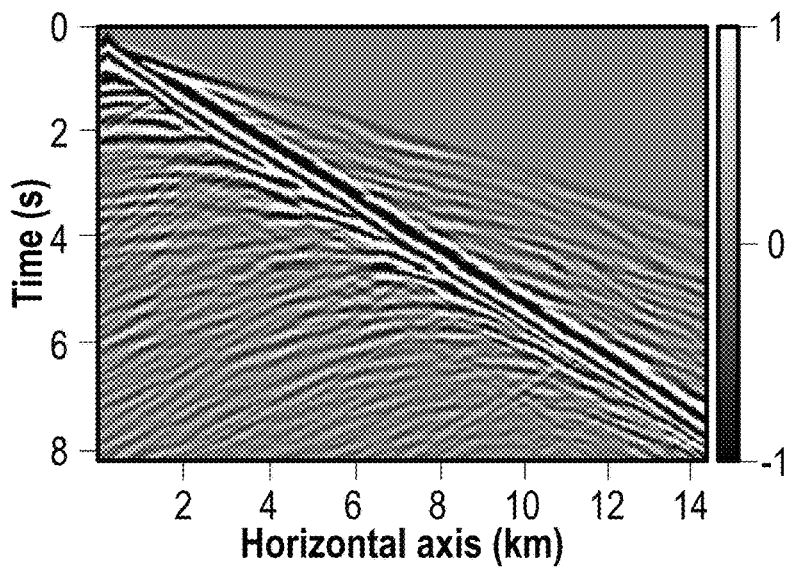
FIGS. 11A-11C show anisotropic seismic datasets in accordance with one or more embodiments.
Figure 11B:
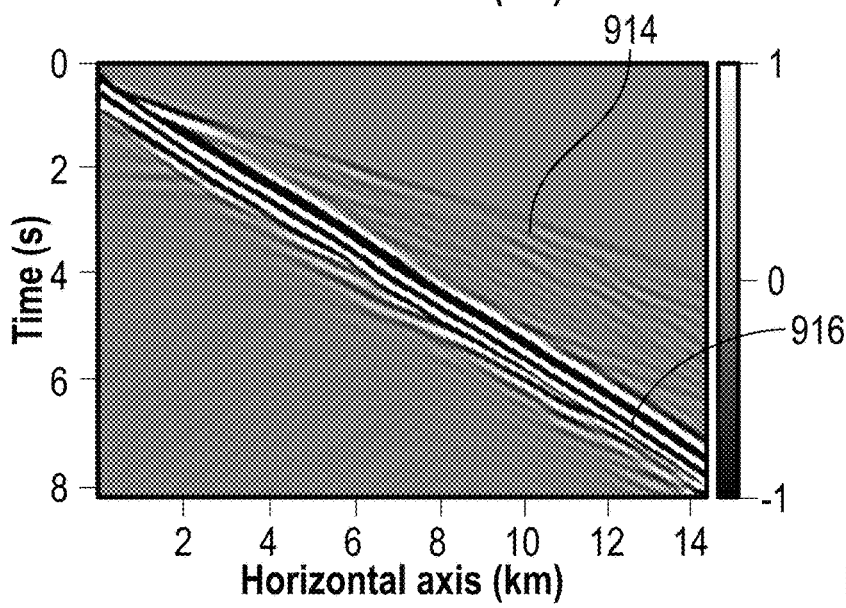
Figure 11C:
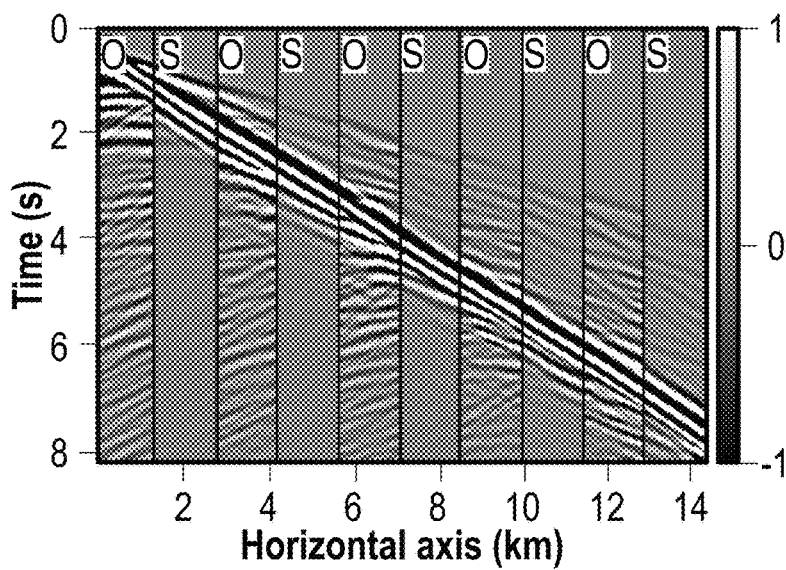

FIGS. 11A-11C show a comparison of a portion of the simulated seismic dataset for the updated seismic velocity model. FIG. 11A shows a portion of the simulated seismic dataset for the true seismic velocity model (shown in FIGS. 8A-8D). FIG. 11A is identical to FIG. 9A except for the marking of areas of coda (910) and (912) depicted in FIG. 9A and omitted in FIG. 11A. FIG. 11B shows the portion of the simulated seismic dataset for the updated seismic velocity model (shown in FIGS. 10A-10D) and may be compared with FIG. 9B which shows a portion of the simulated seismic dataset calculated in Step 706 for the seismic velocity model (shown in FIGS. 8A-8D) obtained in Step 704. Finally, FIG. 11C shows difference between FIG. 11A and FIG. 11B where horizontal portions of FIG. 11A and horizontal portions of FIG. 11B have been interleaved. It will be readily apparent to one of ordinary skill in the art, through a comparison of FIG. 9C and FIG. 11C, that the simulated seismic dataset (FIG. 11B) for the updated seismic velocity model (FIGS. 10A-10D) are much more similar to the observed seismic dataset (FIG. 11A) than the simulated seismic dataset (FIG. 9B) for the seismic velocity model (FIGS. 8E-8H) are to the observed seismic dataset (FIG. 11A). However, the degree of similarity between FIG. 9B and FIG. 11B is much higher at times close to the compressional seismic event (914) and the shear seismic event (916) than at other times.

Figure 12A:
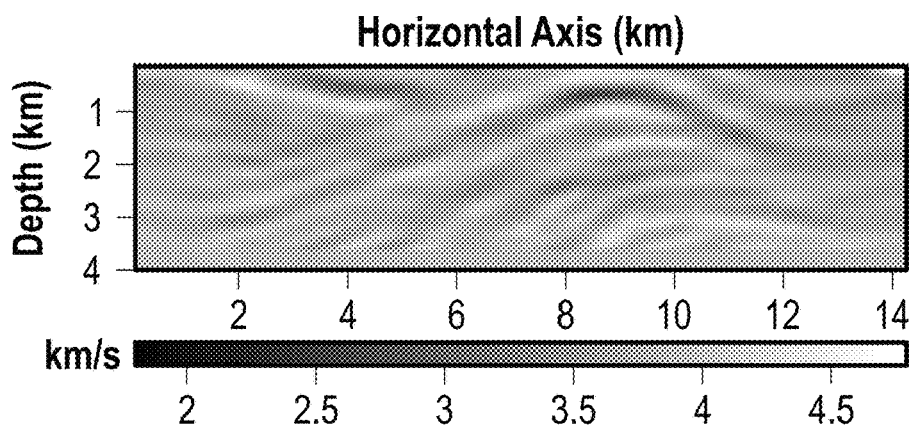
FIGS. 12A-12D show anisotropic seismic velocity models in accordance with one or more embodiments.
Figure 12B:
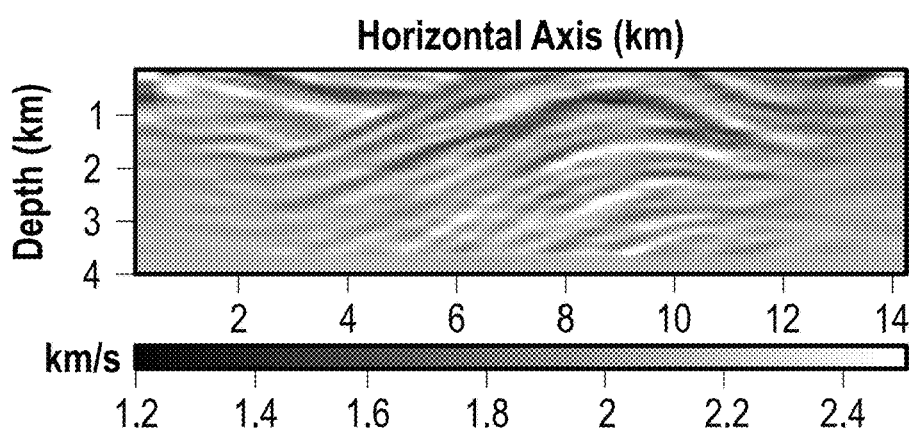
Figure 12C:
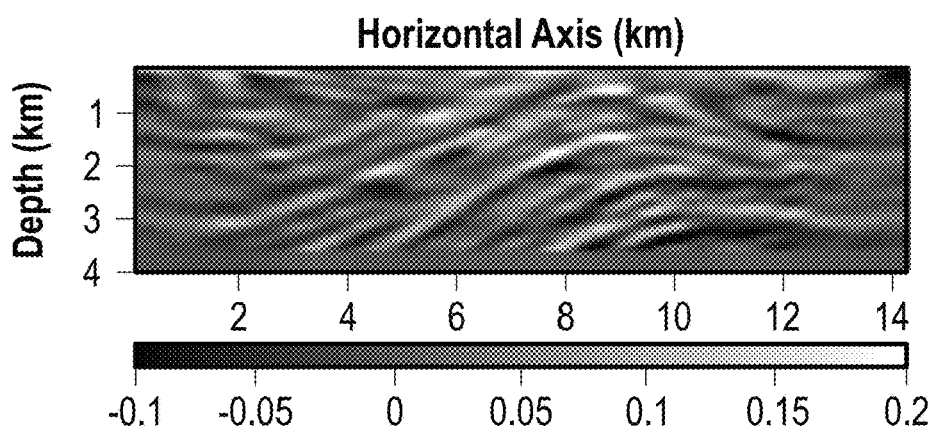
Figure 12D:
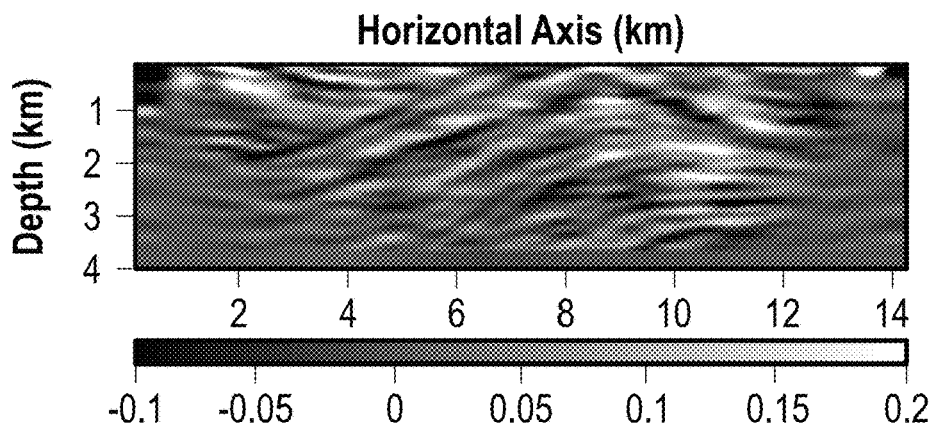

FIGS. 12A-12D shows exemplary results of applying the workflow depicted in FIG. 7 to an observed seismic dataset including Steps 708 and 710. FIG. 12A shows the compressional velocity component of the updated seismic velocity model resulting from the application of the workflow shown in FIG. 7. FIG. 12A may be compared with FIG. 10A, the compressional velocity component of the updated seismic velocity model resulting from the "conventional" workflow, and with FIG. 8A the compressional velocity component of the true seismic velocity model. It is readily apparent to one of ordinary skill in the art that FIG. 12A represents a much less smoothed and much higher resolution estimation of FIG. 8A than is FIG. 10A. Similarly, FIG. 12B represents a much less smoothed and much higher resolution estimation of the anisotropy parameter δ than does FIG. 10B. FIG. 12B is a much more similar to FIG. 8B than FIG. 10B is to FIG. 8B. Similarly, FIG. 12C representing the anisotropic velocity parameter η is a much more similar to FIG. 8C than FIG. 10C is to FIG. 8C. Finally, FIG. 12D represents a much less smoothed and much higher resolution estimation of the shear velocity component of the updated velocity model than is represented in FIG. 10D. FIG. 12D is a much more similar to FIG. 8D than FIG. 10D is to FIG. 8D.

In summary, all the components of the updated velocity model including compressional velocity, shear velocity, and the anisotropic parameters δ and η are more accurately determined by the workflow depicted in FIG. 7 than by the conventional workflow.

Figure 13A:
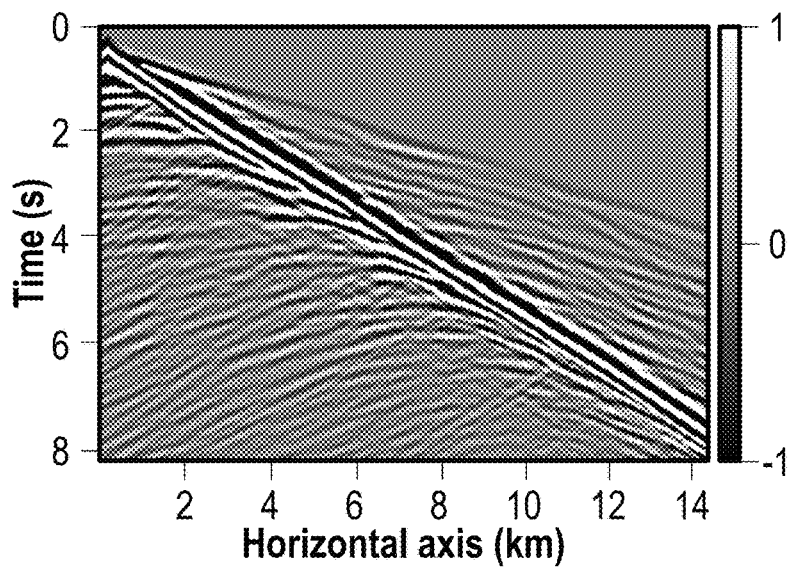
FIGS. 13A-13C show anisotropic seismic datasets in accordance with one or more embodiments.
Figure 13B:
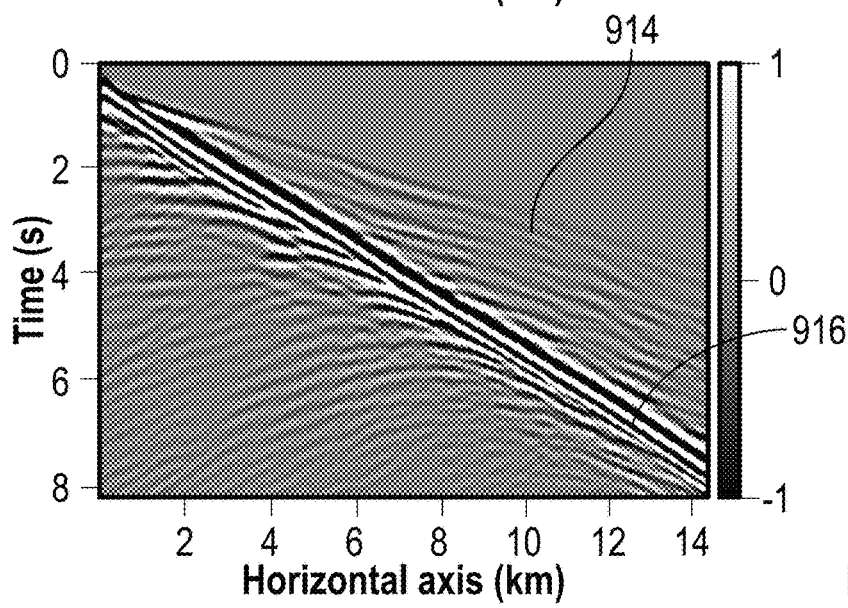
Figure 13C:
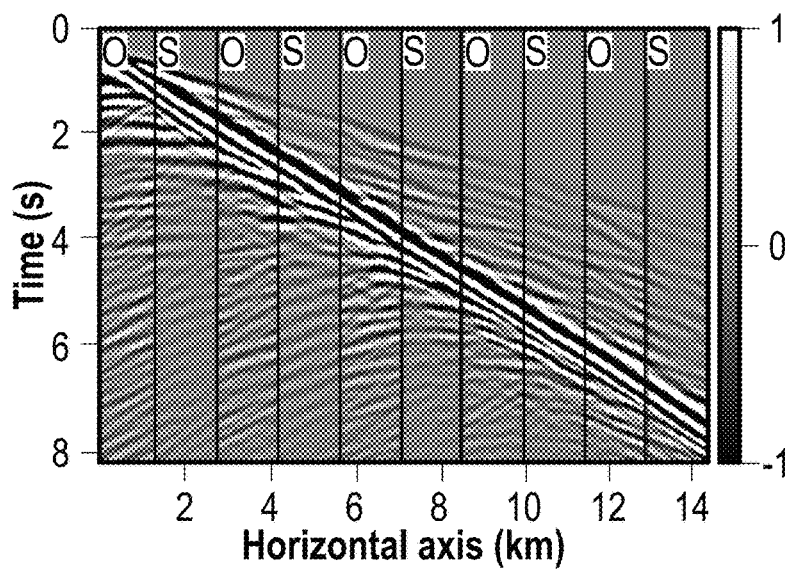

FIGS. 13A-13C show a comparison of a portion of the simulated seismic dataset for the updated seismic velocity model determined by the application of the workflow described in FIG. 7. FIG. 13A shows a portion of the simulated seismic dataset for the true seismic velocity model (shown in FIGS. 8A-8D). FIG. 13A is identical to FIG. 9A except for the marking of areas of coda (910) and (912) depicted in FIG. 9A and omitted in FIG. 13A. FIG. 13B shows the portion of the simulated seismic dataset for the updated seismic velocity model (shown in FIGS. 12A-12D)

and may be compared with FIG. 9B and FIG. 11B. Finally, FIG. 13C emphasizes the difference between FIG. 13A and FIG. 13B by interleaving horizontal portions of FIG. 13A and horizontal portions of FIG. 13B. It will be readily apparent to one of ordinary skill in the art, through a comparison of FIG. 11C and FIG. 13C, that the simulated seismic dataset (FIG. 13B) for the updated seismic velocity model (FIGS. 12A-12D) are much more similar to the observed seismic dataset (FIG. 13A) than the simulated seismic dataset (FIG. 11B) for the updated seismic velocity model (FIGS. 10A-10D) are to the observed seismic dataset (FIG. 13A). This greater degree of similarity between FIG. 9B and FIG. 13B is readily apparent to one of ordinary skill in the art for all times, not only for times close to the compressional seismic event (914) and the shear seismic event (916).

Figure 14:
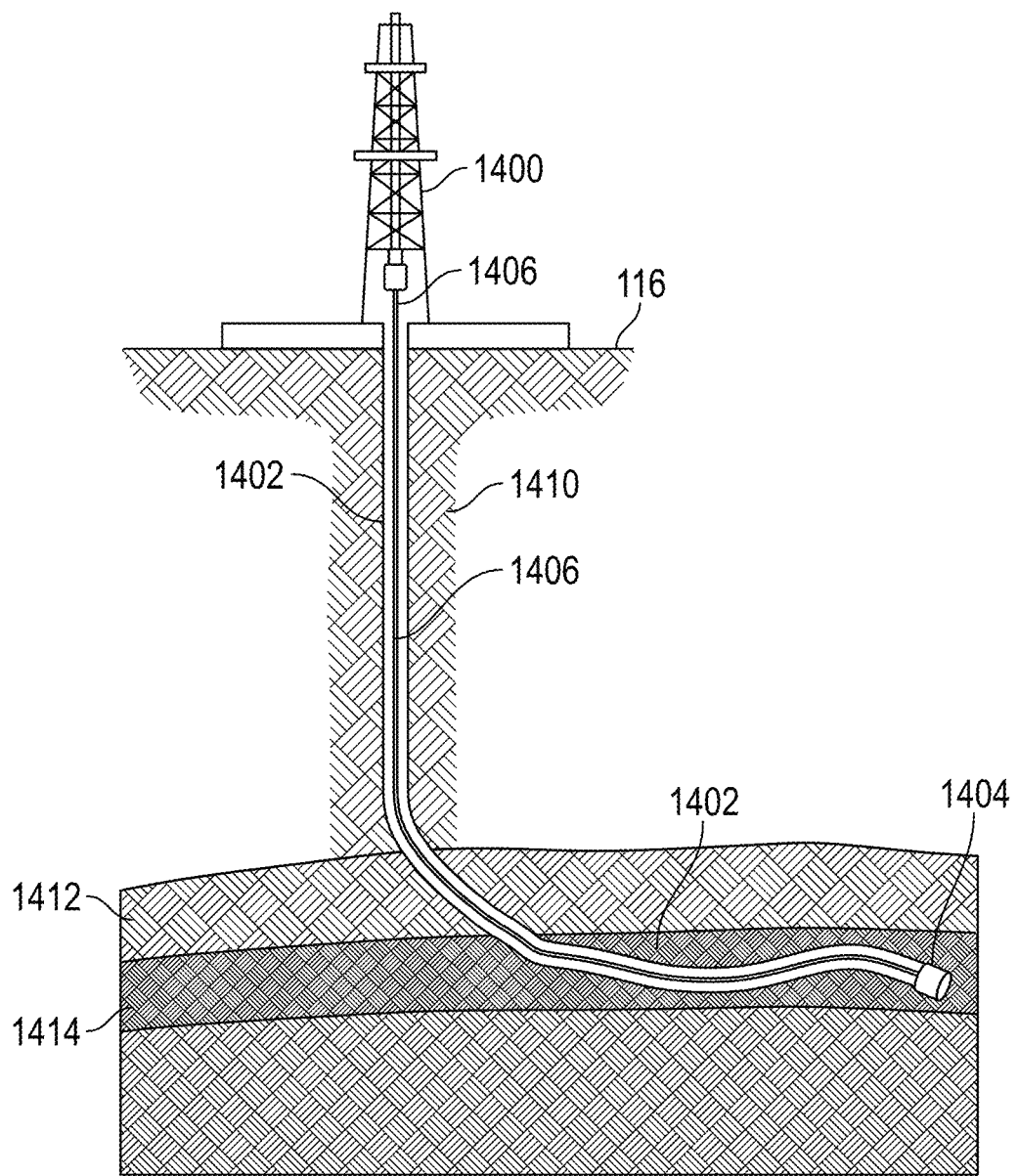
FIG. 14 shows systems in accordance with one or more embodiments.

FIG. 14 illustrates systems in accordance with one or more embodiments. As shown in FIG. 14, a well (1402) may be drilled by a drill bit (1404) attached by a drillstring (1406) to a drill rig (1408) located on the Earth's surface (116). The well may traverse a plurality of overburden layers (1410) and one or more cap-rock layers (1412) to a hydrocarbon reservoir (1414). In accordance with one or more embodiments, the updated seismic velocity model, as shown in FIGS. 12A-12D, may be used to plan and perform the curved well path (1406). An image of the subterranean region of interest may formed using the updated seismic velocity model and the observed seismic dataset, shown in FIG. 13A, and the curved well path (1406) may be planned based, at least in part, on the image.

Figure 15:
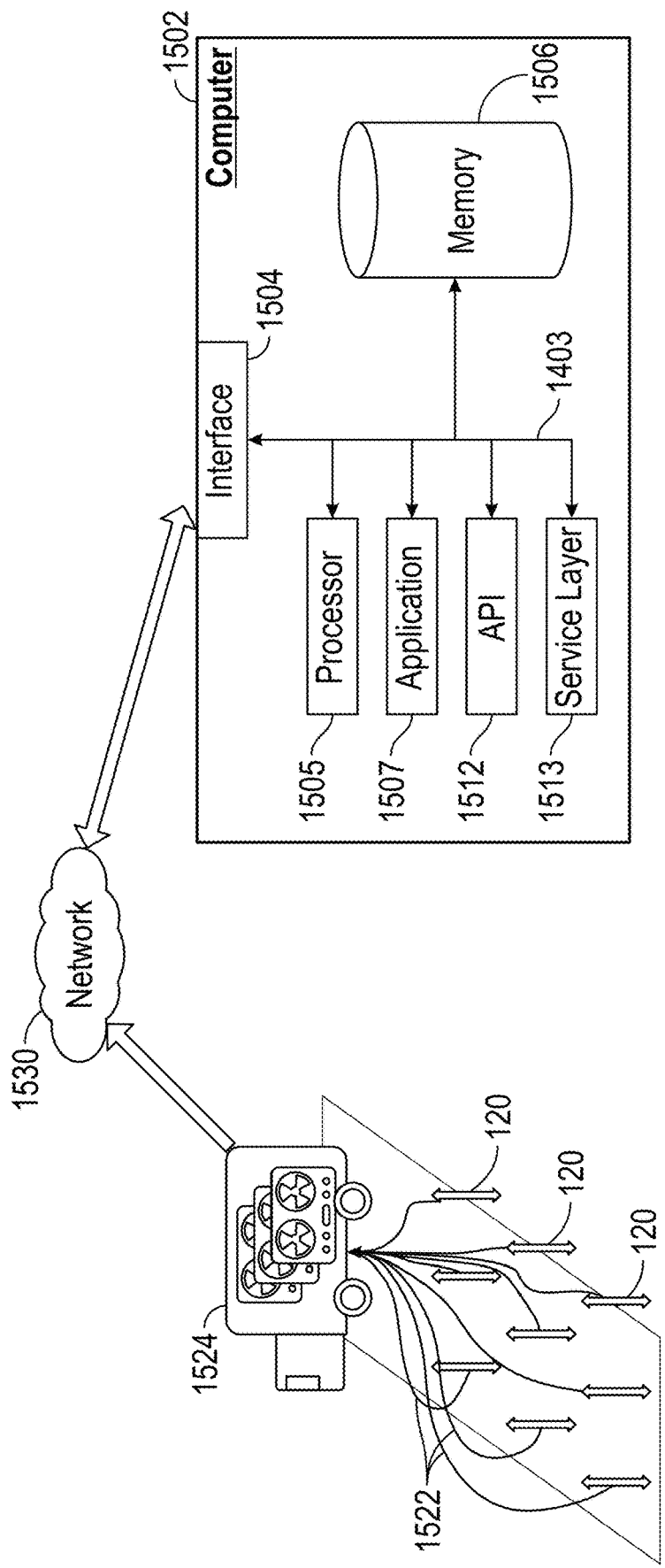
FIG. 15 shows a computer system in accordance with one or more embodiments.

FIG. 15 shows a seismic recording and processing system, in accordance with one or more embodiments. The data recorded by a plurality of seismic receivers (120) may be transmitted to a seismic recording facility (1524) located in the neighborhood of the seismic survey (100). The seismic recording facility may be one or more seismic recording trucks (1524). The plurality of seismic receivers (120) may be in digitally or analogic telecommunication with the seismic recording facility (1524). The telecommunication may be performed over telemetry channels (1522) that may be electrical cables, such as coaxial cables, or may be performed wireless using wireless systems, such as Wi-Fi or Bluetooth. Digitization of the seismic data may be performed at each seismic receiver (120), or at the seismic recording facility (1524), or at an intermediate telemetry node (not shown) between the seismic receiver (120) and the seismic recording facility (1524).

The seismic data may be recorded at the seismic recording facility (1524) and stored on non-transitory computer memory. The computer memory may be one or more computer hard-drives, or one or more computer memory tapes, or any other convenient computer memory media familiar to one skilled in the art. The seismic data may be transmitted to a computer (1502) for processing. The computer (1502) may be located in or near the seismic recording facility (1524) or may be located at a remote location, that may be in another city, country, or continent. The seismic data may be transmitted from the seismic recording facility (1524) to a computer (1502) for processing. The transmission may occur over a network (1530) that may be a local area network using an ethernet or Wi-Fi system, or alternatively the network (1530) may be a wide area network using an internet or intranet service. Alternatively, seismic data may be transmitted over a network (1530) using satellite communication networks. Most commonly, because of its size, seismic data may be transmitted by physically transporting the computer memory, such as computer tapes or hard drives, in which the seismic data is stored from the seismic recording facility (1502) to the location of the computer (1502) to be used for processing.

FIG. 15 further depicts a block diagram of a computer system (1502) used to provide computational functionalities associated with described algorithms, methods, functions, processes, flows, and procedures as described in this disclosure, according to one or more embodiments. The illustrated computer (1502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1502) may include a computer that includes an input device, such as a keypad, keyboard, touch screen, or other device that can accept user information, and an output device that conveys information associated with the operation of the computer (1502), including digital data, visual, or audio information (or a combination of information), or a GUI.

The computer (1502) can serve in a role as a client, network component, a server, a database or other persistency, or any other component (or a combination of roles) of a computer system for performing the subject matter described in the instant disclosure. The illustrated computer (1502) is communicably coupled with a network (1530). In some implementations, one or more components of the computer (1502) may be configured to operate within environments, including cloud-computing-based, local, global, or other environment (or a combination of environments).

At a high level, the computer (1502) is an electronic computing device operable to receive, transmit, process, store, or manage data and information associated with the described subject matter. According to some implementations, the computer (1502) may also include or be communicably coupled with an application server, e-mail server, web server, caching server, streaming data server, business intelligence (BI) server, or other server (or a combination of servers).

The computer (1502) can receive requests over network (1530) from a client application (for example, executing on another computer (1502)) and responding to the received requests by processing the said requests in an appropriate software application. In addition, requests may also be sent to the computer (1502) from internal users (for example, from a command console or by other appropriate access method), external or third-parties, other automated applications, as well as any other appropriate entities, individuals, systems, or computers.

Each of the components of the computer (1502) can communicate using a system bus (1503). In some implementations, any or all of the components of the computer (1502), both hardware or software (or a combination of hardware and software), may interface with each other or the interface (1504) (or a combination of both) over the system bus (1503) using an application programming interface (API) (1512) or a service layer (1513) (or a combination of the API (1512) and service layer (1513). The API (1512) may include specifications for routines, data structures, and object classes. The API (1512) may be either computer-language independent or dependent and refer to a complete interface, a single function, or even a set of APIs. The service layer (1513) provides software services to the computer (1502) or other components (whether or not illustrated) that are communicably coupled to the computer (1502). The functionality of the computer (1502) may be accessible for all service consumers using this service layer. Software services, such as those provided by the service layer (1513), provide reusable, defined business functionalities through a defined interface. For example, the interface may be software written in JAVA, C++, or other suitable language providing data in extensible markup language (XML) format or another suitable format. While illustrated as an integrated component of the computer (1502), alternative implementations may illustrate the API (1512) or the service layer (1513) as stand-alone components in relation to other components of the computer (1502) or other components (whether or not illustrated) that are communicably coupled to the computer (1502). Moreover, any or all parts of the API (1512) or the service layer (1513) may be implemented as child or sub-modules of another software module, enterprise application, or hardware module without departing from the scope of this disclosure.

The computer (1502) includes an interface (1504). Although illustrated as a single interface (1504) in FIG. 15, two or more interfaces (1504) may be used according to particular needs, desires, or particular implementations of the computer (1502). The interface (1504) is used by the computer (1502) for communicating with other systems in a distributed environment that are connected to the network (1530). Generally, the interface (1504 includes logic encoded in software or hardware (or a combination of software and hardware) and operable to communicate with the network (1530). More specifically, the interface (1504) may include software supporting one or more communication protocols associated with communications such that the network (1530) or interface's hardware is operable to communicate physical signals within and outside of the illustrated computer (1502).

The computer (1502) includes at least one computer processor (1505). Although illustrated as a single computer processor (1505) in FIG. 15, two or more processors may be used according to particular needs, desires, or particular implementations of the computer (1502). Generally, the computer processor (1505) executes instructions and manipulates data to perform the operations of the computer (1502) and any algorithms, methods, functions, processes, flows, and procedures as described in the instant disclosure.

The computer (1502) also includes a memory (1506) that holds data for the computer (1502) or other components (or a combination of both) that can be connected to the network (1530). For example, memory (1506) can be a database storing data consistent with this disclosure. Although illustrated as a single memory (1506) in FIG. 15, two or more memories may be used according to particular needs, desires, or particular implementations of the computer (1502) and the described functionality. While memory (1506) is illustrated as an integral component of the computer (1502), in alternative implementations, memory (1506) can be external to the computer (1502).

The application (1507) is an algorithmic software engine providing functionality according to particular needs, desires, or particular implementations of the computer (1502), particularly with respect to functionality described in this disclosure. For example, application (1507) can serve as one or more components, modules, applications, etc. Further, although illustrated as a single application (1507), the application (1507) may be implemented as multiple applications (1507) on the computer (1502). In addition, although illustrated as integral to the computer (1502), in alternative implementations, the application (1507) can be external to the computer (1502).

There may be any number of computers (1502) associated with, or external to, a computer system containing computer (1502), wherein each computer (1502) communicates over network (1530). Further, the term "client," "user," and other appropriate terminology may be used interchangeably as appropriate without departing from the scope of this disclosure. Moreover, this disclosure contemplates that many users may use one computer (1502), or that one user may use multiple computers (1502).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method, comprising:
obtaining, by a seismic acquisition system, an observed seismic dataset for a subterranean region of interest;
receiving, by a seismic processing system, the observed seismic dataset from the seismic acquisition system;
receiving, by the seismic processing system, a seismic velocity model for the subterranean region of interest;
using the seismic processing system:
generating a simulated seismic dataset based, at least in part, on the seismic velocity model and a geometry of the observed seismic dataset,
determining a transformed observed seismic dataset, wherein determining the transformed observed seismic dataset comprises applying a nonlinear amplitude transform to the observed seismic dataset, wherein the nonlinear amplitude transform is selected from the group consisting of a hyperbolic tangent, an arc tangent, and an error function,
determining a transformed simulated seismic dataset, wherein determining the transformed simulated seismic dataset comprises applying the nonlinear amplitude transform to the simulated seismic dataset,
forming an objective function based, at least in part, on the transformed observed seismic dataset and on the transformed simulated seismic dataset,
determining an updated seismic velocity model based, at least in part, upon finding an extremum of the objective function,
forming a seismic image of the subterranean region of interest based, at least in part, on the updated seismic velocity model, and
identifying a portion of the subterranean region of interest with a likelihood of containing oil and gas based, at least in part, on the seismic image of the subterranean region of interest;
determining, using a computer processor, a well path through the portion of the subterranean region of interest based, at least in part, on the identified portion of the subterranean region of interest; and drilling, using a drilling system, a well guided by the well path.

2. The method of claim 1, wherein the nonlinear amplitude transform magnifies a first value of a seismic amplitude more than a second value of the seismic amplitude, wherein the first value is smaller than the second value.

3. The method of claim 1, wherein the seismic velocity model comprises an elastic seismic velocity model.

4. The method of claim 1, wherein the seismic velocity model comprises an anisotropic seismic velocity model.

5. The method of claim 1, wherein determining the updated seismic velocity model comprises:
   determining an adjoint source for each of a plurality of seismic receiver locations;
   simulating, for each of the plurality of seismic receiver locations, propagation of a seismic wave generated by the adjoint source backward in time;
   simulating, for each of a plurality of seismic source locations, propagation of a seismic wave forward in time;
   determining a seismic velocity gradient using an imaging condition based, at least in part, on the simulated propagation of the seismic waves propagated forward in time and the simulated propagation of the seismic waves propagated backward in time;
   determining a seismic velocity increment model by scaling the seismic velocity gradient based, at least in part, on the extremum of the objective function; and
   updating the seismic velocity model based, at least in part, on the seismic velocity increment model.

6. A non-transitory computer readable medium storing instructions executable by a seismic processing system, wherein the instructions, when executed, cause the seismic processing system to perform steps comprising:
   receiving, from a seismic acquisition system, an observed seismic dataset for a subterranean region of interest;
   receiving a seismic velocity model for the subterranean region of interest;
   generating a simulated seismic dataset based, at least in part, on the seismic velocity model and a geometry of the observed seismic dataset;
   determining a transformed observed seismic dataset, wherein determining the transformed observed seismic dataset comprises applying a nonlinear amplitude transform to the observed seismic dataset, wherein the nonlinear amplitude transform is selected from the group consisting of a hyperbolic tangent, an arc tangent, and an error function;
   determining a transformed simulated seismic dataset, wherein determining the transformed simulated seismic dataset comprises applying the nonlinear amplitude transform to the simulated seismic dataset;
   forming an objective function based, at least in part, on the transformed observed seismic dataset and on the transformed simulated seismic dataset;
   determining an updated seismic velocity model based, at least in part, upon finding an extremum of the objective function;
   forming a seismic image of the subterranean region of interest based, at least in part, on the updated seismic velocity model;
   identifying a portion of the subterranean region of interest with a likelihood of containing oil and gas based, at least in part, on the seismic image; and
   determining a well path through the portion of the subterranean region of interest based, at least in part, on the identified portion of the subterranean region of interest.

7. The non-transitory computer readable medium of claim 6, wherein the nonlinear amplitude transform magnifies a first value of a seismic amplitude more than a second value of the seismic amplitude, wherein the first value is smaller than the second value.

8. The non-transitory computer readable medium of claim 6, wherein the seismic velocity model comprises an elastic seismic velocity model.

9. The non-transitory computer readable medium of claim 6, wherein the seismic velocity model comprises an anisotropic seismic velocity model.

10. The non-transitory computer readable medium of claim 6, wherein determining the updated seismic velocity model comprises:
    determining an adjoint source for each of a plurality of seismic receiver locations based, at least in part, on the observed seismic dataset and the simulated seismic dataset;
    simulating, for each of a plurality of seismic source locations and the plurality of seismic receiver locations, propagation of a seismic wave generated by the adjoint source backward in time;
    simulating, for each of the plurality of seismic source locations, propagation of a seismic wave forward in time;
    determining a seismic velocity gradient using an imaging condition based, at least in part, on the simulated propagation of the seismic waves propagated forward in time and the simulated propagation of the seismic waves propagated backward in time;
    determining a seismic velocity increment model by scaling the seismic velocity gradient based, at least in part, on the extremum of the objective function; and
    updating the seismic velocity model based, at least in part, on the seismic velocity increment model.

11. A system, comprising:
    a seismic acquisition system, configured to acquire an observed seismic dataset for a subterranean region of interest; and
    a seismic processing system configured to:
       receive the observed seismic dataset from the seismic acquisition system,
       receive a seismic velocity model for the subterranean region of interest,
       generate a simulated seismic dataset based, at least in part, on the seismic velocity model and a geometry of the observed seismic dataset,
       determine a transformed observed seismic dataset, wherein determining the transformed observed seismic dataset comprises applying a nonlinear amplitude transform to the observed seismic dataset, wherein the nonlinear amplitude transform is selected from the group consisting of a hyperbolic tangent, an arc tangent, and an error function,
       determine a transformed simulated seismic dataset, wherein determining the transformed simulated seismic dataset comprises applying the nonlinear amplitude transform to the simulated seismic dataset,
       form an objective function based, at least in part, on the transformed observed seismic dataset and on the transformed simulated seismic dataset,
       determine an updated seismic velocity model based, at least in part, upon finding an extremum of the objective function,
       form a seismic image of the subterranean region of interest based, at least in part, on the updated seismic velocity model, and identify a portion of the subterranean region of interest with a likelihood of containing oil and gas based, at least in part, on the seismic image; and a drilling system configured to drill a wellbore to penetrate the portion.

12. The system of claim 11, wherein the nonlinear amplitude transform magnifies a first value of a seismic amplitude more than a second value of the seismic amplitude, wherein the first value is smaller than the second value.

13. The system of claim 11, wherein the seismic velocity model comprises an elastic seismic velocity model.

14. The system of claim 11, wherein the seismic velocity model comprises an anisotropic seismic velocity model.

15. The system of claim 11, wherein determining the updated seismic velocity model comprises:

determining an adjoint source for each of a plurality of seismic receiver locations based, at least in part, on the observed seismic dataset and the simulated seismic dataset;

simulating, for each of a plurality of seismic source locations and the plurality of seismic receiver locations, propagation of a seismic wave generated by the adjoint source backward in time;

simulating, for each of the plurality of seismic source locations, propagation of a seismic wave forward in time;

determining a seismic velocity gradient using an imaging condition based, at least in part, on the simulated propagation of the seismic waves propagated forward in time and the simulated propagation of the seismic waves propagated backward in time;

determining a seismic velocity increment model by scaling the seismic velocity gradient based, at least in part, on the extremum of the objective function; and updating the seismic velocity model based, at least in part, on the seismic velocity increment model.

\* \* \* \* \*